US009053361B2

(12) United States Patent
Baheti et al.

(10) Patent No.: US 9,053,361 B2
(45) Date of Patent: Jun. 9, 2015

(54) IDENTIFYING REGIONS OF TEXT TO MERGE IN A NATURAL IMAGE OR VIDEO FRAME

(71) Applicant: QUALCOMM Incorporated, San Diego, CA (US)

(72) Inventors: Pawan Kumar Baheti, Bangalore (IN); Dhananjay Ashok Gore, Bangalore (IN); Hyung-Il Koo, Seoul (KR); Te-Won Lee, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 13/748,539

(22) Filed: Jan. 23, 2013

(65) Prior Publication Data

US 2013/0195315 A1    Aug. 1, 2013

Related U.S. Application Data

(60) Provisional application No. 61/590,966, filed on Jan. 26, 2012, provisional application No. 61/590,983, filed on Jan. 26, 2012, provisional application No. 61/590,973, filed on Jan. 26, 2012, provisional application No. 61/673,703, filed on Jul. 19, 2012.

(51) Int. Cl.
*G06K 9/00* (2006.01)
*G06T 11/60* (2006.01)
(Continued)

(52) U.S. Cl.
CPC ............ *G06K 9/00456* (2013.01); *G06T 11/60* (2013.01); *G06K 9/36* (2013.01); *G06K 9/3258* (2013.01)

(58) Field of Classification Search
USPC ......... 382/100, 112, 173, 176–187, 190, 194, 382/195, 202, 203, 205; 358/462; 348/135
See application file for complete search history.

(56) References Cited

U.S. PATENT DOCUMENTS 3,710,321 A    1/1973    Rubenstein
4,654,875 A    3/1987    Srihari et al.
(Continued)

FOREIGN PATENT DOCUMENTS

EP    1146478 A2    10/2001
EP    1840798       10/2007
(Continued)

OTHER PUBLICATIONS

Chaudhuri, B.B. et al. "Skew Angle Detection of Digitized Indian Script Documents", IEEE Transactions on Pattern Analysis and Machine Intelligence, vol. 19, No. 2, Feb. 1997, pp. 182-186.
(Continued)

*Primary Examiner* — Anand Bhatnagar
(74) *Attorney, Agent, or Firm* — Silicon Valley Patent Group LLP

(57) ABSTRACT

In several aspects of described embodiments, an electronic device and method use a camera to capture an image or a frame of video of an environment outside the electronic device followed by identification of blocks of regions in the image. Each block that contains a region is checked, as to whether a test for presence of a line of pixels is met. When the test is met for a block, that block is identified as pixel-line-present. Pixel-line-present blocks are used to identify blocks that are adjacent. One or more adjacent block(s) may be merged with a pixel-line-present block when one or more rules are found to be satisfied, resulting in a merged block. The merged block is then subject to the above-described test, to verify presence of a line of pixels therein, and when the test is satisfied the merged block is processed normally, e.g. classified as text or non-text.

29 Claims, 11 Drawing Sheets

(51) Int. Cl.
*G06K 9/36* (2006.01)
*G06K 9/32* (2006.01)

(56) References Cited

U.S. PATENT DOCUMENTS

| | | | |
|---|---|---|---|
| 5,321,768 A | 6/1994 | Fenrich et al. | |
| 5,459,739 A | 10/1995 | Handley et al. | |
| 5,465,304 A * | 11/1995 | Cullen et al. | 382/176 |
| 5,519,786 A | 5/1996 | Courtney et al. | |
| 5,563,403 A | 10/1996 | Bessho et al. | |
| 5,633,954 A | 5/1997 | Gupta et al. | |
| 5,751,850 A * | 5/1998 | Rindtorff | 382/178 |
| 5,764,799 A | 6/1998 | Hong et al. | |
| 5,768,451 A | 6/1998 | Hisamitsu et al. | |
| 5,805,747 A | 9/1998 | Bradford | |
| 5,835,633 A | 11/1998 | Fujisaki et al. | |
| 5,844,991 A | 12/1998 | Hochberg et al. | |
| 5,978,443 A | 11/1999 | Patel | |
| 6,023,536 A | 2/2000 | Visser | |
| 6,266,439 B1 * | 7/2001 | Pollard et al. | 382/164 |
| 6,393,443 B1 | 5/2002 | Rubin et al. | |
| 6,473,517 B1 | 10/2002 | Tyan et al. | |
| 6,674,919 B1 | 1/2004 | Ma et al. | |
| 6,678,415 B1 | 1/2004 | Popat et al. | |
| 6,687,421 B1 | 2/2004 | Navon | |
| 6,738,512 B1 | 5/2004 | Chen et al. | |
| 6,954,795 B2 | 10/2005 | Takao et al. | |
| 7,142,727 B2 | 11/2006 | Notovitz et al. | |
| 7,263,223 B2 * | 8/2007 | Irwin | 382/176 |
| 7,333,676 B2 * | 2/2008 | Myers et al. | 382/289 |
| 7,403,661 B2 | 7/2008 | Curry et al. | |
| 7,450,268 B2 * | 11/2008 | Martinez et al. | 358/1.9 |
| 7,724,957 B2 | 5/2010 | Abdulkader | |
| 7,738,706 B2 | 6/2010 | Aradhye et al. | |
| 7,783,117 B2 | 8/2010 | Liu et al. | |
| 7,817,855 B2 | 10/2010 | Yuille et al. | |
| 7,889,948 B2 | 2/2011 | Steedly et al. | |
| 7,961,948 B2 * | 6/2011 | Katsuyama | 382/182 |
| 7,984,076 B2 | 7/2011 | Kobayashi et al. | |
| 8,009,928 B1 | 8/2011 | Manmatha et al. | |
| 8,189,961 B2 | 5/2012 | Nijemcevic et al. | |
| 8,194,983 B2 | 6/2012 | Al-Omari et al. | |
| 8,285,082 B2 | 10/2012 | Heck | |
| 8,306,325 B2 * | 11/2012 | Chang | 382/176 |
| 8,417,059 B2 | 4/2013 | Yamada | |
| 8,542,926 B2 * | 9/2013 | Panjwani et al. | 382/176 |
| 8,644,646 B2 | 2/2014 | Heck | |
| 2003/0026482 A1 | 2/2003 | Dance | |
| 2003/0099395 A1 | 5/2003 | Wang et al. | |
| 2003/0215137 A1 | 11/2003 | Wnek | |
| 2004/0179734 A1 | 9/2004 | Okubo | |
| 2004/0240737 A1 | 12/2004 | Lim et al. | |
| 2005/0041121 A1 | 2/2005 | Steinberg et al. | |
| 2005/0123199 A1 | 6/2005 | Mayzlin et al. | |
| 2005/0238252 A1 | 10/2005 | Prakash et al. | |
| 2006/0039605 A1 | 2/2006 | Koga | |
| 2006/0215231 A1 | 9/2006 | Borrey et al. | |
| 2006/0291692 A1 | 12/2006 | Nakao et al. | |
| 2007/0110322 A1 | 5/2007 | Yuille et al. | |
| 2007/0116360 A1 | 5/2007 | Jung et al. | |
| 2007/0217676 A1 | 9/2007 | Grauman et al. | |
| 2008/0008386 A1 | 1/2008 | Anisimovich et al. | |
| 2008/0063273 A1 | 3/2008 | Shimodaira | |
| 2008/0112614 A1 | 5/2008 | Fluck et al. | |
| 2008/0187225 A1 * | 8/2008 | Katsuyama | 382/190 |
| 2009/0060335 A1 | 3/2009 | Rodriguez Serrano et al. | |
| 2009/0202152 A1 | 8/2009 | Takebe et al. | |
| 2009/0232358 A1 | 9/2009 | Cross | |
| 2009/0252437 A1 | 10/2009 | Li et al. | |
| 2009/0316991 A1 * | 12/2009 | Geva et al. | 382/176 |
| 2009/0317003 A1 | 12/2009 | Heilper et al. | |
| 2010/0049711 A1 | 2/2010 | Singh et al. | |
| 2010/0067826 A1 | 3/2010 | Honsinger et al. | |
| 2010/0080462 A1 | 4/2010 | Miljanic et al. | |
| 2010/0128131 A1 | 5/2010 | Tenchio et al. | |
| 2010/0141788 A1 | 6/2010 | Hwang et al. | |
| 2010/0144291 A1 | 6/2010 | Stylianou et al. | |
| 2010/0172575 A1 | 7/2010 | Lukac et al. | |
| 2010/0195933 A1 | 8/2010 | Nafarieh | |
| 2010/0232697 A1 | 9/2010 | Mishima et al. | |
| 2010/0239123 A1 | 9/2010 | Funayama et al. | |
| 2010/0245870 A1 | 9/2010 | Shibata | |
| 2010/0272361 A1 * | 10/2010 | Khorsheed et al. | 382/187 |
| 2010/0296729 A1 | 11/2010 | Mossakowski | |
| 2011/0052094 A1 | 3/2011 | Gao et al. | |
| 2011/0081083 A1 | 4/2011 | Lee et al. | |
| 2011/0188756 A1 | 8/2011 | Lee et al. | |
| 2011/0215147 A1 | 9/2011 | Goncalves et al. | |
| 2011/0222768 A1 * | 9/2011 | Galic et al. | 382/170 |
| 2011/0249897 A1 | 10/2011 | Chaki et al. | |
| 2011/0274354 A1 | 11/2011 | Nijemcevic | |
| 2011/0280484 A1 | 11/2011 | Ma et al. | |
| 2011/0285873 A1 | 11/2011 | Showering | |
| 2012/0051642 A1 | 3/2012 | Berrani et al. | |
| 2012/0066213 A1 | 3/2012 | Ohguro | |
| 2012/0092329 A1 | 4/2012 | Koo et al. | |
| 2012/0114245 A1 | 5/2012 | Lakshmanan et al. | |
| 2012/0155754 A1 | 6/2012 | Chen et al. | |
| 2013/0001295 A1 | 1/2013 | Goncalves | |
| 2013/0058575 A1 | 3/2013 | Koo et al. | |
| 2013/0129216 A1 | 5/2013 | Tsai et al. | |
| 2013/0194448 A1 | 8/2013 | Baheti et al. | |
| 2013/0195360 A1 | 8/2013 | Krishna Kumar et al. | |
| 2013/0308860 A1 | 11/2013 | Mainali et al. | |
| 2014/0003709 A1 | 1/2014 | Ranganathan et al. | |
| 2014/0023270 A1 | 1/2014 | Baheti et al. | |
| 2014/0023271 A1 | 1/2014 | Baheti et al. | |
| 2014/0023273 A1 | 1/2014 | Baheti et al. | |
| 2014/0023274 A1 | 1/2014 | Barman et al. | |
| 2014/0023275 A1 | 1/2014 | Krishna Kumar et al. | |
| 2014/0023278 A1 | 1/2014 | Krishna Kumar et al. | |
| 2014/0168478 A1 | 6/2014 | Baheti et al. | |

FOREIGN PATENT DOCUMENTS

| | | |
|---|---|---|
| EP | 2192527 A1 | 6/2010 |
| GB | 2453366 A | 4/2009 |
| GB | 2468589 A | 9/2010 |
| WO | 2004077358 A1 | 9/2004 |

OTHER PUBLICATIONS

Chen, X. et al. "Detecting and Reading Text in Natural Scenes," IEEE Computer Society Conference on Computer Vision and Pattern Recognition (CVPR'04), 2004, pp. 1-8.

Epshtein, B. et al. "Detecting text in natural scenes with stroke width transform," Computer Vision and Pattern Recognition (CVPR) 2010, pp. 1-8, (as downloaded from "http://research.microsoft.com/pubs/149305/1509.pdf").

Jain, A. K. et al. "Automatic text location in images and video frames", Pattern Recognition, vol. 31, No. 12, 1998, pp. 2055-2076.

Jayadevan, R. et al. "Offline Recognition of Devanagari Script: A Survey", IEEE Transactions on Systems, Man, and Cybernetics—Part C: Applications and Reviews, 2010, pp. 1-15.

Kapoor, R. et al. "Skew angle detection of a cursive handwritten Devanagari script character image", Indian Institute of Science, May-Aug. 2002, pp. 161-175.

Lee, S-W. et al. "A new methodology for gray-scale character segmentation and recognition," IEEE Transactions on Pattern Analysis and Machine Intelligence, vol. 18, No. 10, Oct. 1996, pp. 1045-1050.

Li, H. et al. "Automatic Text Detection and Tracking in a Digital Video", IEEE Transactions on Image Processing, vol. 9 No. 1, Jan. 2000, pp. 147-156.

Matas, J. et al. "Robust Wide Baseline Stereo from Maximally Stable Extremal Regions", Proc. of British Machine Vision Conference, 2002, pp. 384-393.

Mikulik, A. et al. "Construction of Precise Local Affine Frames," Center for Machine Perception, Czech Technical University in Prague, Czech Republic, Abstract and second paragraph of Section 1; Algorithms 1 & 2 of Section 2 and Section 4, International Conference on Pattern Recognition, 2010, pp. 1-5.

(56) References Cited

OTHER PUBLICATIONS

Pal, U. et al. "Indian script character recognition: a survey", Pattern Recognition Society, published by Elsevier Ltd, 2004, pp. 1887-1899.
Shin, H. et al. "Application of Floyd-Warshall LabellingTechnique: Identification of Connected Pixel Components in Binary Image", Kangweon-Kyungki Math. Jour. 14 (2006), No. 1, pp. 47-55.
Nister, D. et al. "Linear Time Maximally Stable Extremal Regions", ECCV, 2008, Part II, LNCS 5303, pp. 183-196, published by Springer-Verlag Berlin Heidelberg.
Park, J-M. et al. "Fast Connected Component Labeling Algorithm Using a Divide and Conquer Technique", believed to be published in Matrix (2000), vol. 4, Issue: 1, Publisher: Elsevier Ltd, pp. 4-7.
Elgammal, A. M. et al. "Techniques for Language Identification for Hybrid Arabic-English Document Images", believed to be published in 2001 in Proceedings of IEEE 6th International Conference on Document Analysis and Recognition, pp. 1-5.
Pardo, M. et al. "Learning From Data: A Tutorial With Emphasis on Modern Pattern Recognition Methods," IEEE Sensors Journal, vol. 2, No. 3, Jun. 2002, pp. 203-217.
Holmstrom, L. et al. "Neural and Statistical Classifiers—Taxonomy and Two Case Studies," IEEE Transactions on Neural Networks, vol. 8, No. 1, Jan. 1997, pp. 5-17.
Machine Learning, retrieved from http://en.wikipedia.org/wiki/Machine_learning, May 7, 2012, pp. 1-8.
Moving Average, retrieved from http://en.wikipedia.org/wiki/Moving_average, Jan. 23, 2013, pp. 1-5.
Chen, H. et al. "Robust Text Detection in Natural Images With Edge-Enhanced Maximally Stable Extremal Regions", believed to be published in IEEE International Conference on Image Processing (ICIP), Sep. 2011, pp. 1-4.
Dlagnekov, L. et al. "Detecting and Reading Text in Natural Scenes", Oct. 2004, pp. 1-22.
Vedaldi, A. "An Implementation of Multi-Dimensional Maximally Stable Extremal Regions", Feb. 7, 2007, pp. 1-7.
VLFeat—Tutorials—MSER, retrieved from http://www.vlfeat.org/overview/mser.html, Apr. 30, 2012, pp. 1-2.
Renold, M. "Detecting and Reading Text in Natural Scenes", Master's Thesis, May 2008, pp. 1-59.
Jain, A. K. et al. "Automatic Text Location in Images and Video Frames," believed to be published in Proceedings of Fourteenth International Conference on Pattern Recognition, vol. 2, Aug. 1998, pp. 1497-1499.
Chaudhuri B., Ed., "Digital Document Processing—Major Directions and Recent Advances", 2007, Springer-Verlag London Limited, XP002715747, ISBN : 978-1-84628-501-1 pp. 103-106, p. 106, section "5.3.5 Zone Separation and Character Segmentation", paragraph 1.
Chaudhuri B.B., et al., "An OCR system to read two Indian language scripts: Bangla and Devnagari (Hindi)", Proceedings of the 4th International Conference on Document Analysis and Recognition (ICDAR). Ulm, Germany, Aug. 18-20, 1997; [Proceedings of the ICDAR], Los Alamitos, IEEE Comp. Soc, US, vol. 2, Aug. 18, 1997, pp. 1011-1015, XP010244882, DOI: 10.1109/ICDAR.1997.620662 ISBN: 978-0-8186-7898-1 the whole document.
Chaudhury S (Eds.): "OCR Technical Report for the project Development of Robust Document Analysis and Recognition System for Printed Indian Scripts", 2008, pp. 149-153, XP002712777, Retrieved from the Internet: URL:http://researchweb.iiit.ac.inj-jinesh/ocrDesignDoc.pdf [retrieved on Sep. 5, 2013].
Dalal N., et al., "Histograms of oriented gradients for human detection", Computer Vision and Pattern Recognition, 2005 IEEE Computer Society Conference on, IEEE, Piscataway, NJ, USA, Jun. 25, 2005, pp. 886-893 vol. 1, XP031330347, ISBN: 978-0-7695-2372-9 Section 6.3.
Forssen P.E., et al., "Shape Descriptors for Maximally Stable Extremal Regions", Computer Vision, 2007. ICCV 2007. IEEE 11th International Conference on, IEEE, PI, Oct. 1, 2007, pp. 1-8, XP031194514, ISBN: 978-1-4244-1630-1 abstract Section 2. Multi-resoltuion MSER.
Minoru M., Ed., "Character Recognition", Aug. 2010, Sciyo, XP002715748, ISBN: 978-953-307-105-3 pp. 91-95, p. 92, section "7.3 Baseline Detection Process".
Pal U et al., "Multi-skew detection of Indian script documents" Document Analysis and Recognition, 2001. Proceedings. Sixth International Conference on Seattle, WA, USA Sep. 10-13, 2001, Los Aalmitos, CA, USA, IEEE Comput. Soc. US, Sep. 10, 2001, pp. 292-296, XP010560519, DOI:10.1109/ICDAR.2001.953801, ISBN: 978-0-7695-1263-1.
Pal U., et al., "OCR in Bangla: an Indo-Bangladeshi language", Pattern Recognition, 1994. vol. 2—Conference B: Computer Vision & Image Processing., Proceedings of the 12th IAPR International. Conferenc E on Jerusalem, Israel Oct. 9-13, 1994, Los Alamitos, CA, USA, IEEE Comput. Soc, vol. 2, Oct. 9, 1994, pp. 269-273, XP010216292, DOI: 10.1109/ICPR.1994.576917 ISBN: 978-0-8186-6270-6 the whole document.
Premaratne H.L., et al., "Lexicon and hidden Markov model-based optimisation of the recognised Sinhala script", Pattern Recognition Letters, Elsevier, Amsterdam, NL, vol. 27, No. 6, Apr. 15, 2006, pp. 696-705, XP027922538, ISSN: 0167-8655.
Ray A.K et al., "Information Technology—Principles and Applications". 2004. Prentice-Hall of India Private Limited. New Delhi! XP002712579, ISBN: 81-203-2184-7, pp. 529-531.
Senda S., et al., "Fast String Searching in a Character Lattice," IEICE Transactions on Information and Systems, Information & Systems Society, Tokyo, JP, vol. E77-D, No. 7, Jul. 1, 1994, pp. 846-851, XP000445299, ISSN: 0916-8532.
Senk V., et al., "A new bidirectional algorithm for decoding trellis codes," EUROCON' 2001, Trends in Communications, International Conference on Jul. 4-7, 2001, Piscataway, NJ, USA, IEEE, Jul. 4, 2001, pp. 34-36, vol. I, XP032155513, DOI :10.1109/EURCON.2001.937757 ISBN : 978-0-7803-6490-5.
Sinha R.M.K., et al., "On Devanagari document processing", Systems, Man and Cybernetics, 1995. Intelligent Systems for the 21st Century., IEEE International Conference on Vancouver, BC, Canada Oct. 22-25, 1995, New York, NY, USA,IEEE, US, vol. 2, Oct. 22, 1995, pp. 1621-1626, XP010194509, DOI: 10.1109/ICSMC.1995.538004 ISBN: 978-0-7803-2559-3 the whole document.
Uchida S et al., "Skew Estimation by Instances", 2008 The Eighth IAPR International Workshop on Document Analysis Systems, Sep. 1, 2008, pp. 201-208, XP055078375, DOI: 10.1109/DAS.2008.22, ISBN: 978-0-76-953337-7.
Unser M., "Sum and Difference Histograms for Texture Classification", Transactions on Pattern Analysis and Machine Intelligence, IEEE, Piscataway, USA, vol. 30, No. 1, Jan. 1, 1986, pp. 118-125, XP011242912, ISSN: 0162-8828 section A; p. 122, right-hand column p. 123.
Chen Y.L., "A knowledge-based approach for textual information extraction from mixed text/graphics complex document images", Systems Man and Cybernetics (SMC), 2010 IEEE International Conference on, IEEE, Piscataway, NJ, USA, Oct. 10, 2010, pp. 3270-3277, XP031806156, ISBN: 978-1-4244-6586-6.
Co-pending U.S. Appl. No. 13/748,562, filed Jan. 23, 2013, (47 pages).
Co-pending U.S. Appl. No. 13/831,237, filed Mar. 14, 2013, (34 pages).
Co-pending U.S. Appl. No. 13/842,985, filed Mar. 15, 2013, (53 pages).
Song Y., et al., "A Handwritten Character Extraction Algorithm for Multi-language Document Image", 2011 International Conference on Document Analysis and Recognition, Sep. 18, 2011, pp. 93-98, XP055068675, DOI: 10.1109/ICDAR2011.28 ISBN: 978-1-45-771350-7.
Wu V., et al., "TextFinder: An Automatic System to Detect and Recognize Text in Images", IEEE Transactions on Pattern Analysis and Machine Intelligence, vol. 21. No. 11, Nov. 1, 1999, pp. 1224-1229, XP055068381.
Agrawal, et al., "Generalization of Hindi OCR Using Adaptive Segmentation and Font Files," V. Govindaraju, S. Setlur (eds.), Guide to OCR for Indic Scripts, Advances in Pattern Recognition, DOI 10.1007/978-1-84800-330-9_10, Springer-Verlag London Limited 2009, pp. 181-207.

(56) References Cited

OTHER PUBLICATIONS

"4.1 Points and patches" In: Szeliski Richard: "Computer Vision—Algorithms and Applications", 2011, Springer-Verlag, London, XP002696110, p. 195, ISBN: 978-1-84882-934-3.

Agrawal M., et al., "2 Base Devanagari OCR System" In: Govindaraju V, Srirangataj S (Eds.): "Guide to OCR for Indic Scripts—Document Recognition and Retrieval", 2009, Springer Science+Business Media, London, XP002696109, pp. 184-193, ISBN: 978-1-84888-329-3.

Chowdhury A.R., et al., "Text Detection of Two Major Indian Scripts in Natural Scene Images", Sep. 22, 2011, Camera-Based Document Analysis and Recognition, Springer Berlin Heidelberg, pp. 42-57, XP019175802, ISBN: 978-3-642-29363-4.

Ghoshal R., et al., "Headline Based Text Extraction from Outdoor Images", 4th International Conference on Pattern Recognition and Machine Intelligence, Springer LNCS, vol. 6744, Jun. 27, 2011, pp. 446-451, XP055060285.

International Search Report and Written Opinion—PCT/US2013/022994—ISA/EPO—May 13, 2013, pp. 1-13.

Papandreou A. et al., "A Novel Skew Detection Technique Based on Vertical Projections", International Conference on Document Analysis and Recognition, Sep. 18, 2011, pp. 384-388, XP055062043, DOI: 10.1109/ICDAR.2011.85, ISBN: 978-1-45-771350-7.

Setlur, et al., "Creation of data resources and design of an evaluation test bed for Devanagari script recognition", Research Issues in Data Engineering: Multi-lingual Information Management, RIDE-MLIM 2003. Proceedings. 13th International Workshop, 2003, pp. 55-61.

\* cited by examiner of contents recognizes text fields containing the journal title, issue number, date, and each article field, so should the computer. This analysis also enables the implementation of a hypertext feature that links each article entry in the table of contents to the first page of that article.

OCR is performed in parallel with the layout analysis and labeling. While current OCR technology is highly accurate on clean printed material, errors still occur. Therefore, our OCR post-

FIG. 3C
(PRIOR ART)

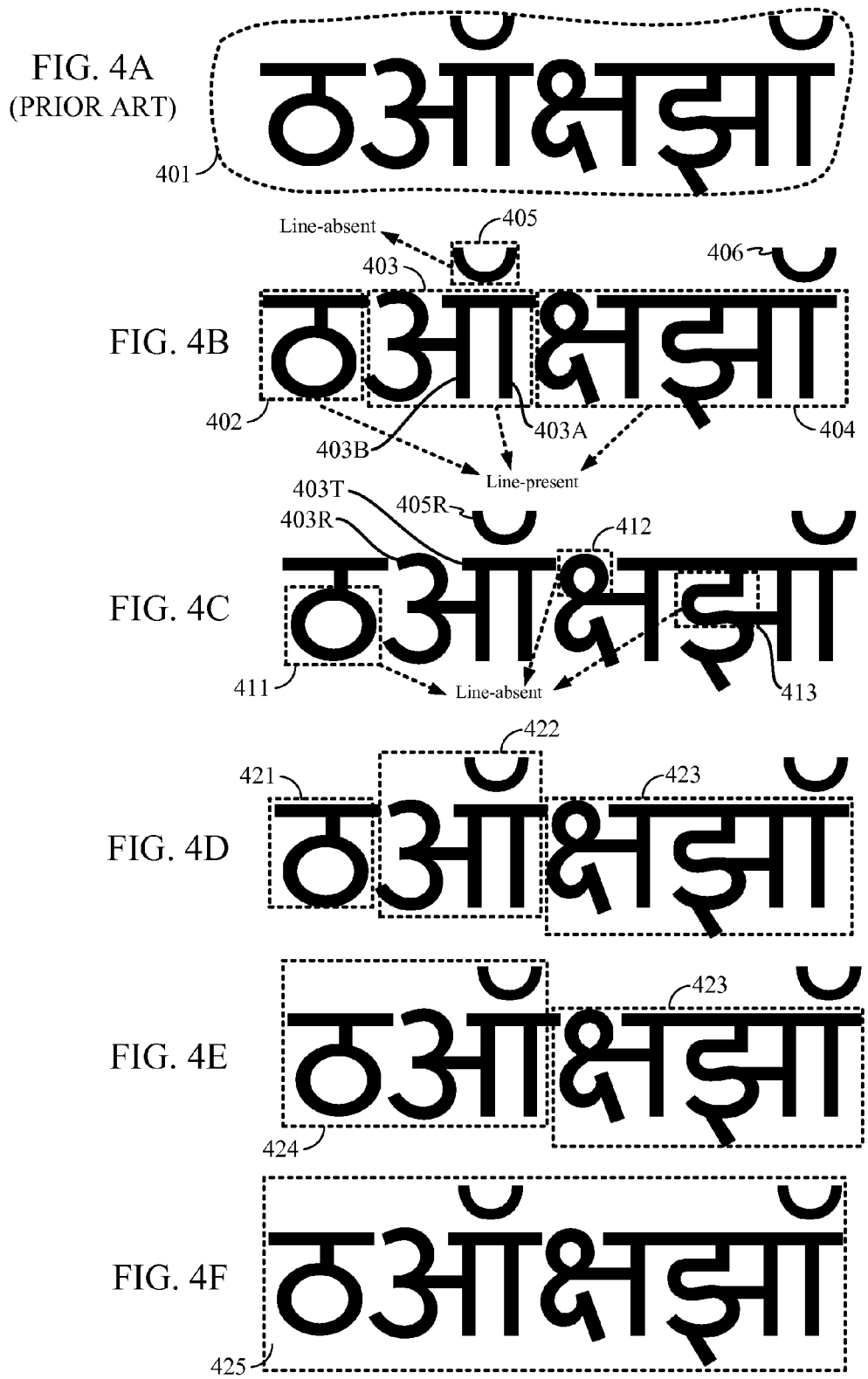

IDENTIFYING REGIONS OF TEXT TO MERGE IN A NATURAL IMAGE OR VIDEO FRAME

CROSS-REFERENCE TO PROVISIONAL APPLICATION

This application claims priority under 35 USC §119 (e) from U.S. Provisional Application No. 61/590,966 filed on Jan. 26, 2012 and entitled "Identifying Regions Of Text To Merge In A Natural Image or Video Frame", which is assigned to the assignee hereof and which is incorporated herein by reference in its entirety.

This application claims priority under 35 USC §119 (e) from U.S. Provisional Application No. 61/590,983 filed on Jan. 26, 2012 and entitled "Detecting and Correcting Skew In Regions Of Text In Natural Images", which is assigned to the assignee hereof and which is incorporated herein by reference in its entirety.

This application claims priority under 35 USC §119 (e) from U.S. Provisional Application No. 61/590,973 filed on Jan. 26, 2012 and entitled "Rules For Merging Blocks Of Connected Components In Natural Images", which is assigned to the assignee hereof and which is incorporated herein by reference in its entirety.

This application claims priority under 35 USC §119 (e) from U.S. Provisional Application No. 61/673,703 filed on Jul. 19, 2012 and entitled "Automatic Correction of Skew In Natural Images and Video", which is assigned to the assignee hereof and which is incorporated herein by reference in its entirety.

CROSS-REFERENCE TO RELATED APPLICATIONS

This application is also related to U.S. application Ser. No. 13/748,562, filed concurrently herewith, entitled "Detecting and Correcting Skew In Regions Of Text In Natural Images" which is assigned to the assignee hereof and which is incorporated herein by reference in its entirety.

This application is also related to U.S. application Ser. No. 13/748,574, filed concurrently herewith, entitled "Rules For Merging Blocks Of Connected Components In Natural Images" which is assigned to the assignee hereof and which is incorporated herein by reference in its entirety.

FIELD

This patent application relates to devices and methods for identifying in natural images or video frames, regions to merge that may contain text.

BACKGROUND

Identification of text regions in documents that are scanned (e.g. by an optical scanner of a printer or copier) is significantly easier than detecting text regions in images generated by a handheld camera, of scenes in the real world (also called "natural images"). Specifically, optical character recognition (OCR) methods of the prior art originate in the field of document processing, wherein the document image contains a series of lines of text (e.g. 20 lines of text) of a scanned page in a document. Document processing techniques, although successfully used on scanned documents created by optical scanners, generate too many false positives and/or negatives so as to be impractical when used on natural images. Hence, detection of text regions in a real world image generated by a handheld camera is performed using different techniques. For additional information on techniques used in the prior art, to identify text regions in natural images, see the following articles that are incorporated by reference herein in their entirety as background:

(a) H. Li et al. "Automatic text detection and tracking in digital video," IEEE transactions on Image processing, vol. 9., no. 1, pp. 147-156, 2000;

(b) X. Chen and A. Yuille, "Detecting and reading text in natural scenes," IEEE Computer Society Conference on Computer Vision and Pattern Recognition (CVPR'04), 2004, pages 1-8;

(c) S. W. Lee et al, "A new methodology for gray-scale character segmentation and recognition," IEEE Transactions on Pattern Analysis and Machine Intelligence, October 1996, pp. 1045-1050, vol. 18, no. 10;

(d) B. Epshtein et al, "Detecting text in natural scenes with stroke width transform," Computer Vision and Pattern Recognition (CVPR) 2010, pages 2963-2970; and (e) A. Jain and B. Yu, "Automatic text location in images and video frames", Pattern Recognition, 1998, pp. 2055-2076, Vol. 31, No. 12.

Image processing techniques of the prior art described above appear to be developed primarily to identify regions in images that contain text which is written in the language English. Use of such techniques to identify in natural images, regions of text in other languages that use different scripts for letters of their alphabets can result in false positives and/or negatives so as to render the techniques impractical.

FIG. 1A illustrates a newspaper 100 in the real world in India. A user 110 (see FIG. 1B) may use a camera-equipped mobile device (such as a cellular phone) 108 to capture an image 107 of newspaper 100. Camera captured image 107 may be displayed on a screen 106 of mobile device 108. Such an image 107 (FIG. 1C), if processed directly using prior art image processing techniques may result in failure to classify one or more regions 103 as text (see FIG. 1A). Specifically, text-containing regions of a camera-captured image may be classified as non-text and vice versa e.g. due to variations in lighting, color, tilt, focus, etc.

Additionally, presence in natural images, of text written in non-English languages, such as Hindi can result in false positives/negatives, when technique(s) developed primarily for identifying text in the English language are used in classification of regions as text/non-text. For example, although blocks in regions that contain text in the English language may be correctly classified to be text (e.g. by a neural network), one or more blocks 103A, 103B, 103C and 103D (FIG. 1C) in a region 103 contain text in Hindi that may be mis-classified as non-text (e.g. even when the neural network has been trained with text in Hindi).

One or more prior art criteria that are used by a classifier to identify text in natural images can be relaxed, so that blocks 103A-103D are then classified as text, but on doing so one or more portions of another region 105 (FIG. 1C) may coincidentally satisfy the relaxed criteria, and blocks in region 105 may be then mis-classified as text although these blocks contain graphics (e.g., pictures of cars in FIG. 1B).

Moreover, when a natural image 107 (FIG. 1C) is processed by a prior art method to form rectangular blocks, certain portions of text may be omitted from a rectangular block that is classified as text. For example, pixels in such text portions may be separated from (i.e. not contiguous with) pixels that form the remainder of text in the rectangular block, due to pixels at a boundary of the rectangular block not satisfying a prior art test used to form the rectangular block. Such omission of pixels of a portion of text, from a rectangular block adjacent to the portion is illustrated in FIG. 1C at least twice. See pixels of text to the left of block 103B, and see pixels of text to the left of block 103C (in FIG. 1C). Also, when skew becomes large (e.g. 30 degrees) as illustrated in FIG. 1D, several prior art classifiers fail to classify the block correctly. Even assuming skew is corrected, omission of text portions from rectangular blocks of a natural image can result in errors, when such incomplete blocks are further processed after classification, e.g. by an optical character recognition (OCR) system.

Accordingly, there is a need to improve the identification of regions of text in a natural image or video frame, as described below.

SUMMARY

In several aspects of described embodiments, an electronic device and method use a camera to capture an image of a scene of real world outside the electronic device, followed by identification of blocks that enclose regions of pixels in the image, with each region being initially included in a single block. Depending on the embodiment, each region may be identified to have pixels contiguous with one another and including a local extrema (maxima or minima) of intensity in the image, e.g. a maximally stable extremal region (MSER). In some embodiments, each block that contains such a region (which may constitute a "connected component") is checked, prior to classification as text or non-text, as to whether a predetermined test is met, for presence along a line, of pixels that have intensities binarizable to a common value (e.g. value 0 or 1) in the block. When the predetermined test is met for a block, the block is marked in memory as pixel-line-present (and otherwise the block may be marked as pixel-line-absent).

In certain embodiments, a pixel-line-present block is used to identify one or more blocks that are located adjacent thereto. Blocks identified as being located adjacent may be merged with a pixel-line-present block to which they are adjacent (e.g. when one or more rules for merging are met), to obtain a merged block. In several embodiments, a first set of positions of pixels of a first region in a first block marked as pixel-line-present is merged with a second set of positions of pixels of a second region in a second block adjacent thereto, to obtain a merged set of positions of a merged block. In the just-described merged block, pixels of the first region and pixels of the second region do not contact one another because, each region itself constitutes a connected component, that is normally unconnected to any other such region.

Merging of two or more blocks as described above is performed prior to classification of any pixel in the blocks being merged (e.g. in the first region of pixels and the second region of pixels) as text or non-text. Hence, a verification operation is additionally performed, wherein the above-described checking is re-done in some embodiments, on the merged block (with multiple connected components therein). Specifically, in some embodiments, as pixels in the blocks that are merged have not yet been classified as text or non-text, hence the checking is repeated (or re-done), in order to verify that the merged block itself satisfies the predetermined test, for presence along a line, of a plurality of pixels with intensities that are binarizable to the common value, (also called "pixel line") in a binarized version of the merged block.

The predetermined test may or may not be met by the merged block, e.g. depending on intensities of pixels in the blocks that are merged. On verification, when the predetermined test for presence of a pixel line is found to be met by the merged block (with multiple connected components therein), then the merged block may itself (as a whole) be classified as text or non-text, e.g. by use of a neural network. The merged block, on being classified as text, may then be further processed normally, e.g. subject to optical character recognition (OCR), wherein the merged block is sliced into sub-blocks, followed by detection of a character of text in each sub-block.

In some embodiments, one or more of the checking, the marking, the identifying, the merging, the repeating (or re-doing) and the classifying described above are performed by one or more processor(s) that are operatively coupled to the memory (described above) and configured to execute computer instructions stored in the memory (or in another non-transitory computer readable storage media). Moreover, in some embodiments, one or more non-transitory storage media include a plurality of computer instructions, which when executed, cause one or more processors in a handheld device to perform operations, and these computer instructions include computer instructions to perform one or more of the checking, the marking, the identifying, the merging, the repeating and the classifying described above.

In certain embodiments, one or more acts of the type described above are performed by a mobile device (such as a smart phone) that includes a camera, a memory operatively connected to the camera to receive images therefrom, and at least one processor operatively coupled to the memory and configured to execute computer instructions stored in the memory (or in another non-transitory computer readable storage media). On execution of the computer instructions, the processor processes an image to generate a merged block that is obtained by merging a pixel-line-present block with a block adjacent thereto, followed by verification of presence of a pixel line in the merged block, followed by classification of the pixel-line-present merged block as text or non-text, followed by OCR of blocks that are classified as text (in the normal manner). In some embodiments, an apparatus includes several means implemented by logic in hardware or logic in software or a combination thereof, to perform one or more acts described above.

It is to be understood that several other aspects of the described embodiments will become readily apparent to those skilled in the art from the description herein, wherein it is shown and described various aspects by way of illustration. The drawings and detailed description below are to be regarded as illustrative in nature and not as restrictive.

BRIEF DESCRIPTION OF THE DRAWINGS

FIG. 3C illustrates another projection profile of English text in prior art.

FIG. 4A illustrates an example of text in a prior art image.

FIGS. 4B-4F illustrate formation of a block by use of the method of FIG. 2 in illustrative aspects of the described embodiments.

DETAILED DESCRIPTION

Figure 1A:
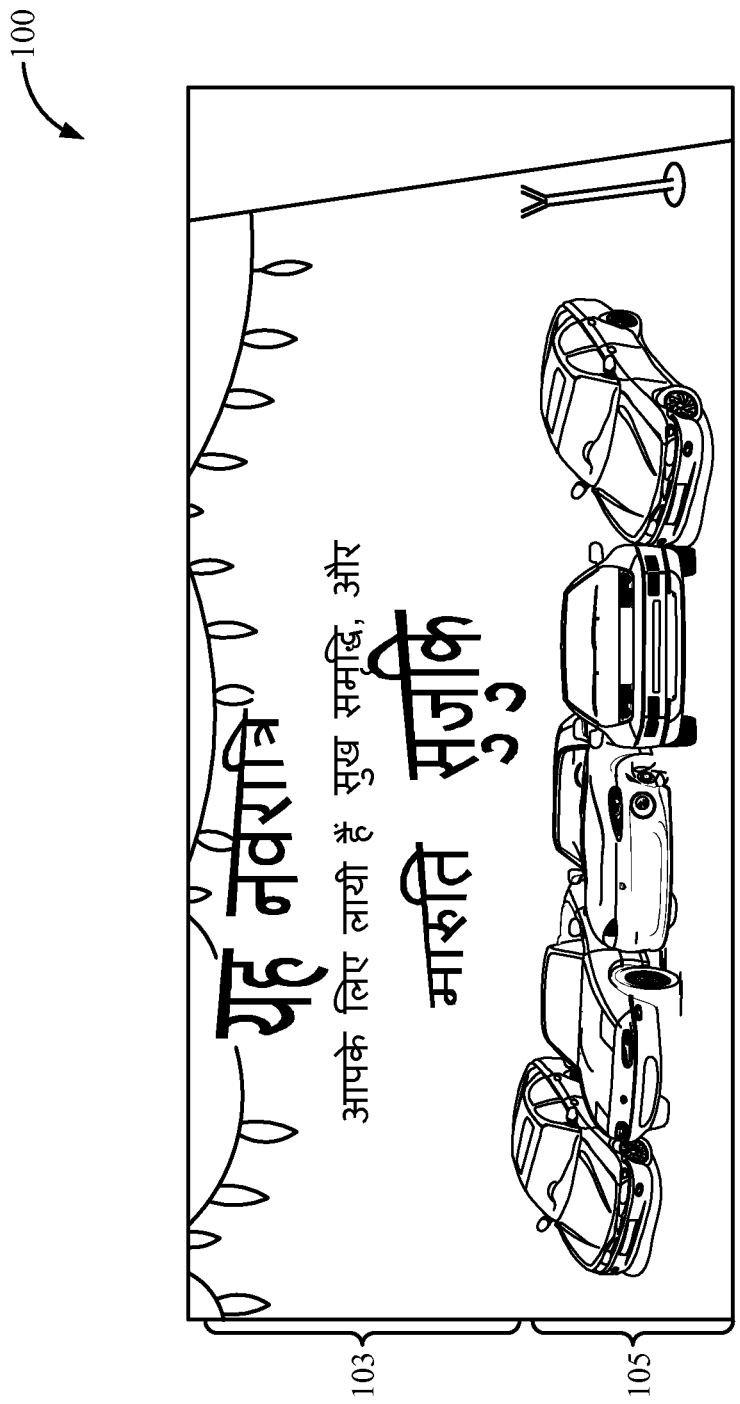
FIG. 1A illustrates a newspaper of the prior art, in the real world in India.
Figure 1B:
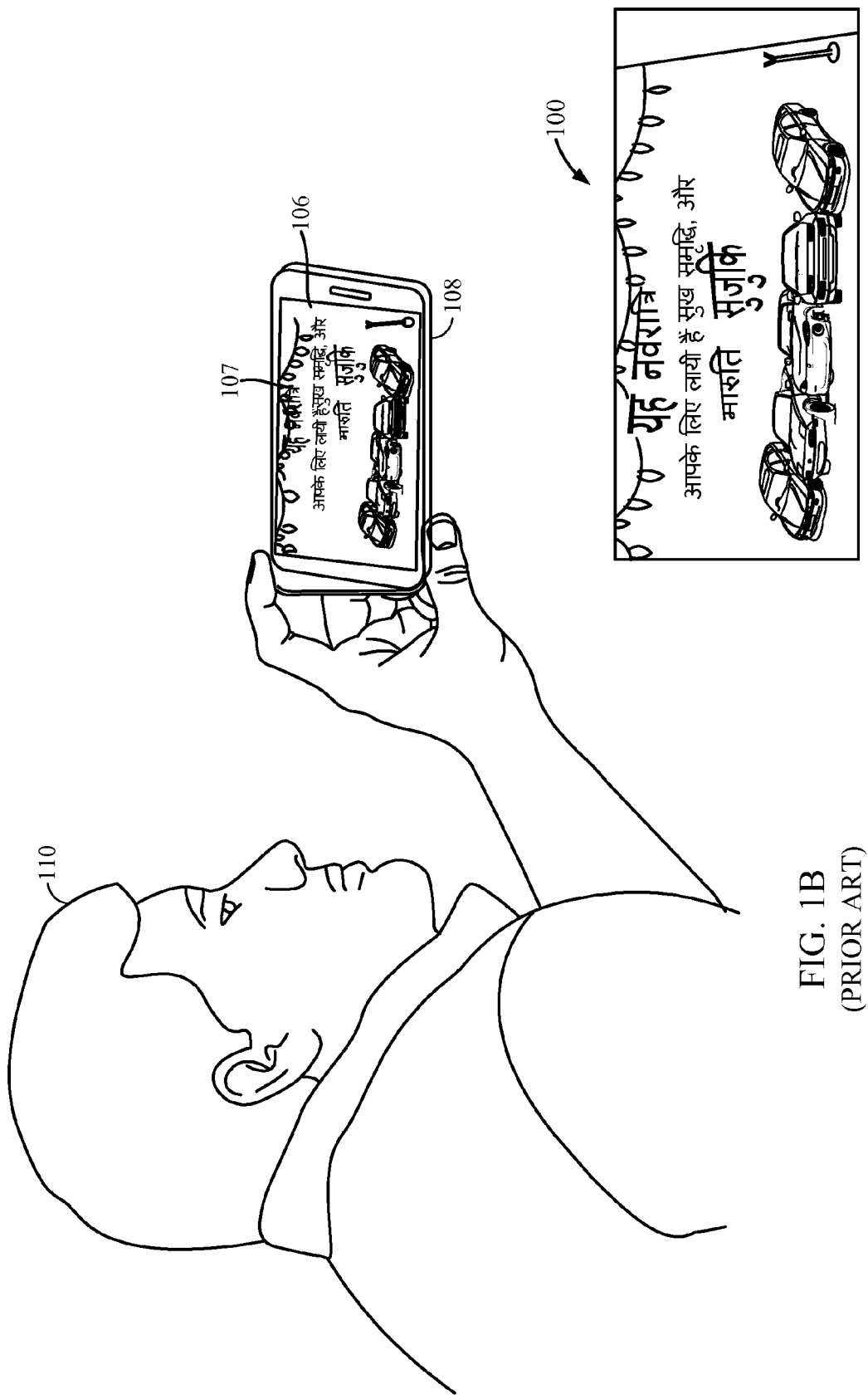
FIG. 1B illustrates a user using a camera-equipped mobile device of the prior art to capture an image of a newspaper in the real world.
Figure 1D:
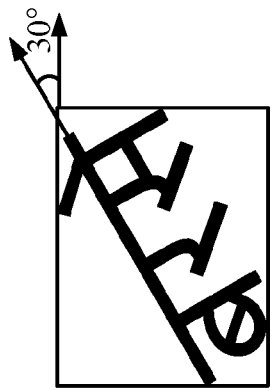
FIG. 1D illustrates a prior art image containing a word of text skewed by 30° relative to the camera.

A number of regions of an image of a real world scene (e.g. an image 107 of a newspaper 100 in FIG. 1B) are initially identified in several aspects of the described embodiments, in the normal manner. Hence, a mobile device (e.g. a smartphone or a tablet which can be held in a human hand) 200 in certain described embodiments may use a camera 1011 (FIG. 5) included therein, to capture an image of an environment outside the mobile device 200, such as a scene of real world. Mobile device 200 of some embodiments includes one or more processors 1013 (FIG. 5) programmed with merger software 141, classifier software 552, and OCR software 551 (all of which are stored in a memory 1012, which may be any non-transitory memory that is computer readable). OCR software 551 is used to eventually recognize text in one or more image(s) 107 generated by camera 1011, e.g. by performing Optical Character Recognition ("OCR"). Depending on the embodiment, camera 1011 may be a digital camera that captures still images (also called "snapshots"), or a video camera that generates a video stream of images at a known rate, e.g. 30 frames/second.

Figure 2:
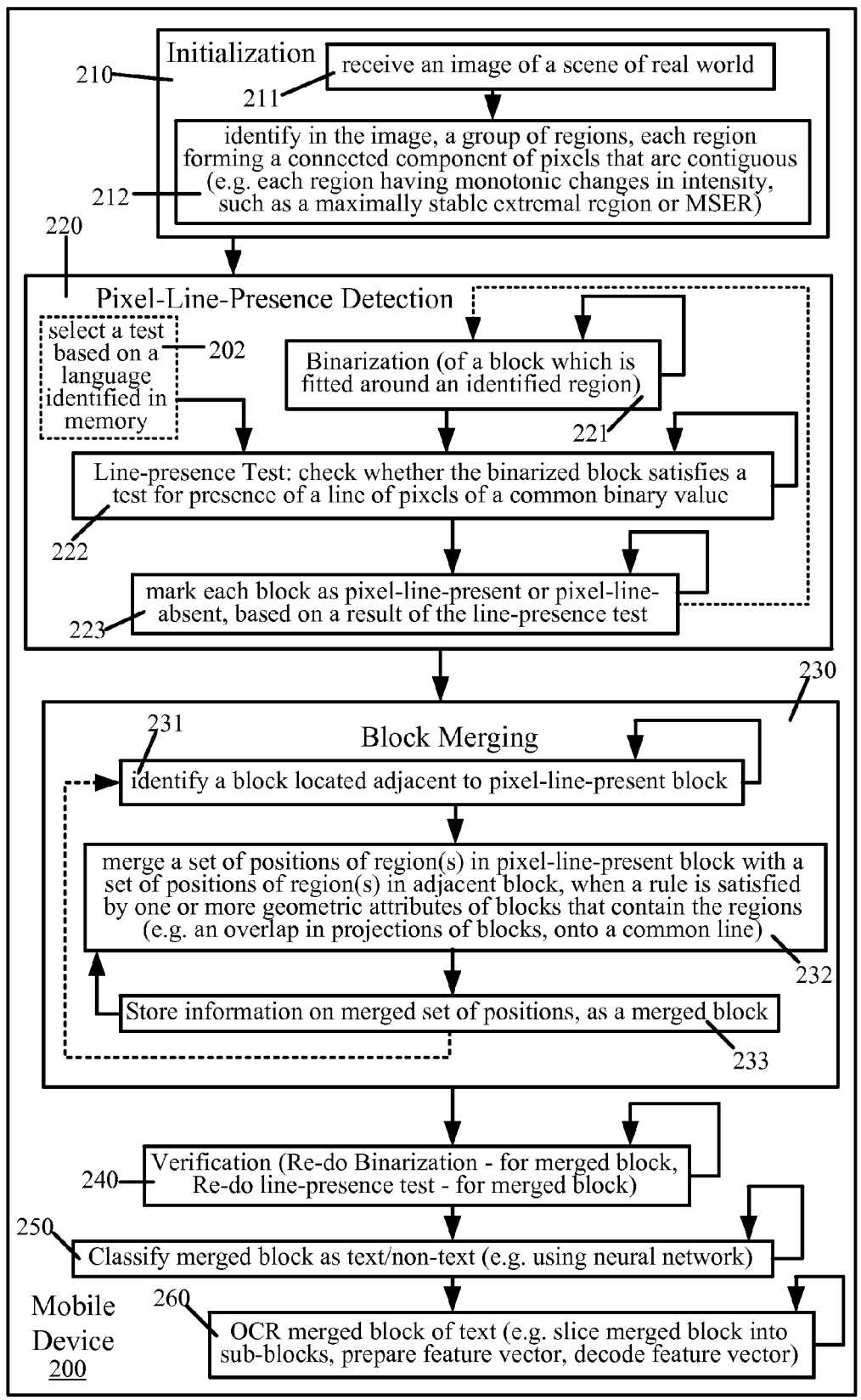
FIG. 2 illustrates, in a high-level flow chart, various acts in a method of identifying regions to merge performed by a mobile device in some aspects of the described embodiments.

Accordingly, an image 107 (e.g. a hand-held camera captured image) received by a processor 1013 of mobile device 200 in certain described embodiments, as per act 211 in FIG. 2 is a snapshot (in a set of snapshots generated by a digital camera) or a video frame (in a stream of video frames generated by a video camera) or any image stored in memory and retrieved therefrom. In many embodiments, image 107 is not generated by an optical scanner, of a copier or printer and instead image 107 is generated by a hand-held camera, as noted above. In alternative embodiments, image 107 is generated by an optical scanner, of a copier or printer, from printed paper. Although processor 1013, which performs one or more acts shown in FIG. 2 is included in mobile device 200 of some embodiments, in other embodiments, the processor 1013 which is programmed to perform one or more acts described herein is external to mobile device 200, e.g. included in a server to which mobile device 200 is operatively coupled by a wireless link.

After receipt of image 107, processor 1013 in described embodiments identifies, as per act 212 in FIG. 2, a set of regions (also called "blobs") in image 107 with boundaries that differ from surrounding pixels in a predetermined manner (as specified in a parameter input to the method) from surrounding pixels in one or more properties, such as intensity and/or color. Some methods that may be used in act 212 first identify a pixel of local minima or maxima (also called "extrema") of a property (such as intensity) in the image, followed by identifying neighboring pixels that are contiguous with one another and with the identified extrema pixel, within a range of values of the property that is obtained in a predetermined manner, so as to identify in act 212 an MSER region.

Specifically, MSERs that are identified in act 212 of some embodiments are regions that are geometrically contiguous (with any one pixel in the region being reachable from any other pixel in the region by traversal of one or more pixels that contact one another in the region) with monotonic transformation in property values, and invariant to affine transformations (transformations that preserve straight lines and ratios of distances between points on the straight lines). Boundaries of MSERs may be used as connected components in some embodiments described herein, to identify regions of an image, as candidates for recognition as text.

In several of the described embodiments, regions in image 107 are automatically identified in act 212 based on variation in intensities of pixels by use a method of the type described by Matas et al., e.g. in an article entitled "Robust Wide Baseline Stereo from Maximally Stable Extremal Regions" Proc. Of British Machine Vision Conference, pages 384-396, published 2002 that is incorporated by reference herein in its entirety. The time taken to identify MSERs in an image can be reduced by use of a method of the type described by Nister, et al., "Linear Time Maximally Stable Extremal Regions", ECCV, 2008, Part II, LNCS 5303, pp 183-196, published by Springer-Verlag Berlin Heidelberg that is also incorporated by reference herein in its entirety. Another such method is described in, for example, an article entitled "Robust Text Detection In Natural Images With Edge-Enhanced Maximally Stable Extremal Regions" by Chen et al, IEEE International Conference on Image Processing (ICIP), September 2011 that is incorporated by reference herein in its entirety.

The current inventors note that prior art methods of the type described by Chen et al. or by Matas et al. or by Nister et al. identify hundreds of MSERs, and sometimes identify thousands of MSERs in an image 107 that includes details of natural features, such as leaves of a tree or leaves of plants, shrubs, and bushes. Hence, use of MSER methods of the type described above result in identification of regions whose number depends on the content within the image 107. Moreover, a specific manner in which pixels of a region differ from surrounding pixels at the boundary identified by such an MSER method may be predetermined in some embodiments by use of a lookup table in memory. Such a lookup table may supply one or more specific combinations of values for the parameters Δ and Max Variation, which are input to an MSER method (also called MSER input parameters). Such a lookup table may be populated ahead of time, with specific values for Δ and Max Variation, e.g. determined by experimentation to generate contours that are appropriate for recognition of text in a natural image, such as value 8 for Δ and value 0.07 for Max Variation.

In some embodiments, pixels are identified in a set (which may be implemented in a list) that in turn identifies a region $Q_i$ which includes a local extrema of intensity (such as local maxima or local minima) in the image 107. Such a region $Q_i$ may be identified in act 212 (FIG. 2) as being maximally stable relative to one or more intensities in a range i−Δ to i+Δ (depending on the embodiment, including the above-described intensity i), each intensity i being used as a threshold (with A being a parameter input to an MSER method) in comparisons with intensities of a plurality of pixels included in region $Q_i$ to identify respective regions $Q_{i-\Delta}$ and $Q_{i+\Delta}$. In some embodiments, a number of pixels in the region $Q_i$ remains within a predetermined (e.g. user specified) range relative to changes in intensity i across a range i−Δ to i+Δ, with a local minima in a ratio $[Q_{i-\Delta}-Q_{i+\Delta}]/Q_i$ occurring at the intensity i. Therefore, the just-described set of positions in certain embodiments are indicative of (or identify) a region $Q_i$ that constitutes an MSER (i.e. a maximally stable extremal region).

Other methods that can be used to identify such regions in act 212 may be similar or identical to methods for identification of connected components, e.g. as described in an article entitled "Application of Floyd-Warshall Labelling Technique: Identification of Connected Pixel Components In Binary Image" by Hyunkyung Shin and Joong Sang Shin, published in Kangweon-Kyungki Math. Jour. 14 (2006), No. 1, pp. 47-55 that is incorporated by reference herein in its entirety, or as described in an article entitled "Fast Connected Component Labeling Algorithm Using A Divide and Conquer Technique" by Jung-Me Park, Carl G. Looney and Hui-Chuan Chen believed to be published in Matrix (2000), Volume: 4, Issue: 1, Publisher: Elsevier LTD, pp 4-7 that is also incorporated by reference herein in its entirety.

A specific manner in which regions of an image 107 are identified in act 212 by mobile device 200 in described embodiments can be different, depending on the embodiment. Each region of image 107 that is identified by use of an MSER method of the type described above is represented by act 212 in the form of a list of pixels, with two coordinates for each pixel, namely the x-coordinate and the y-coordinate in two dimensional space (of the image).

After identification of regions, each region is initially included in a single rectangular block which may be automatically identified by mobile device 200 of some embodiments in act 212, e.g. as a minimum bounding rectangle of a region, by identification of a largest x-coordinate, a largest y-coordinate, a smallest x-coordinate and a smallest y-coordinate of all pixels within the region. The just-described four coordinates may be used in act 212, or subsequently when needed, to identify the corners of a rectangular block that tightly fits the region. As discussed below, such a block (and therefore its four corners) may be used in checking whether a predetermined rule is satisfied, e.g. by one or more geometric attributes of the block relative to an adjacent block (such as overlap of projection ("support") on a common line). Also, a block's four sides may need to be identified, in order to identify all pixels in the block and their binarizable values, followed by generation of a profile of counts of pixels of a common binary value. When needed, four corners of a rectangular block that includes a region may be identified, e.g. as follows:
(largest x-coordinate, largest y-coordinate),
(largest x-coordinate, smallest y-coordinate),
(smallest x-coordinate, largest y-coordinate) and
(smallest x-coordinate, smallest y-coordinate).

Figure 1C:
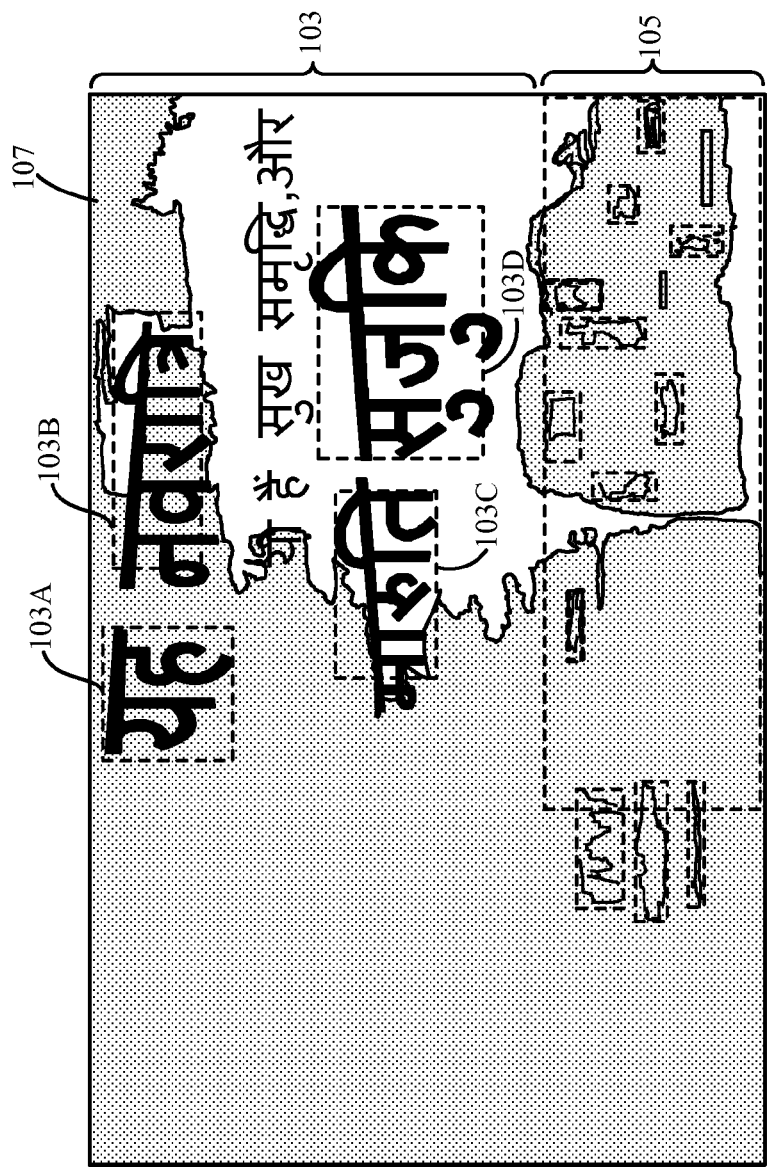
FIG. 1C illustrates blocks formed by identifying connected components in a portion of the image of FIG. 1B by use of a prior art method.

The above-described acts 211 and 212 are performed in several embodiments, an initialization operation 210 (FIG. 2) in a manner similar or identical to corresponding operations of the prior art, for example as described above in reference to FIGS. 1A-1C. Accordingly, each block (also called "unmerged block" or "initially identified block") that is identified at the end of act 212 of some embodiments contains a single region (which may constitute a "connected component"), such as an MSER.

Figure 3A:
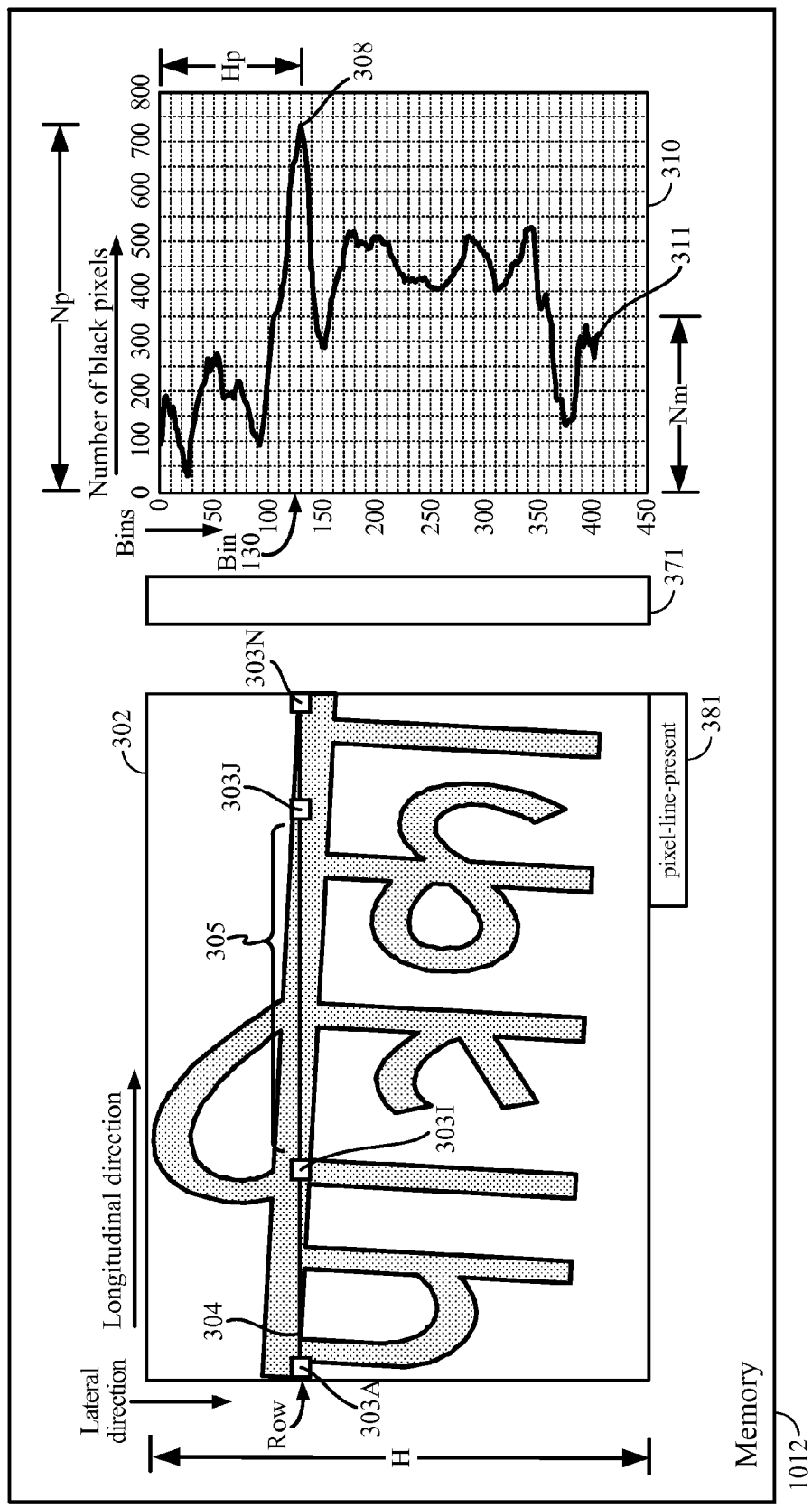
FIG. 3A illustrates a memory of a mobile device during application of a predetermined test to detect pixel line presence, in illustrative aspects of the described embodiments.

After a set of blocks are identified in act 212, such as block 302 in FIG. 3A, processor 1013 in mobile device 200 of some described embodiments determines in an operation 220 (see FIG. 2), whether or not block 302 has a peak in the number of pixels 303I-303J (FIG. 3A) that can be binarized (i.e. binarizable) to a common value (e.g. to a value 1 or value 0 in a binarized version of block 302), located along a straight line 304 (FIG. 3A) through block 302, which straight line satisfies a test which includes a predetermined condition (e.g. peak is located in the top $\frac{1}{3}^{rd}$ of the block). In several embodiments, operation 220 is performed in a deterministic manner, i.e. without learning (and without use of a neural network).

Processor 1013 of certain embodiments is programmed, in any deterministic manner that will be apparent to the skilled artisan in view of this detailed description, to determine occurrence of pixels binarizable to value 1 (or alternatively to value 0) along a straight line defined by the equation $y=mx+c$ that satisfy a specific test. For example, some embodiments of processor 1013 may be programmed to simply enter the x,y coordinates of all pixels of a block 302 into such an equation, to determine for how many pixels in the block (that are binarizable to value 1) is such an equation satisfied (e.g. within preset limits). For example, to check if there is a straight line that is oriented parallel to the x-axis in block 302, processor 1013 may be programmed to set the slope m=0, then check if there are any pixels in block 302 at a common y coordinate (with a value of the constant c in the above-identified equation), which can be binarized to the value 1 (and then repeat for the value 0). In this manner, processor 1013 may be programmed to use a series of values (e.g. integer values) of constant "c" in the equation, to check for presence of lines parallel to the x-axis, at different values of y-coordinates of pixels in block 302.

During operation 220 (of pixel-line-presence detection), processor 1013 of some embodiments performs at least three acts 221-223 as follows. Specifically, in act 221 of several embodiments, processor 1013 is programmed to perform an initial binarization of pixels of a block 302 which is fitted around a region (e.g. the region पत्रिका in FIG. 3A) identified by act 212 (described above). The initial binarizing in act 221 is performed individually, on each unmerged block, as a part of the operation 220 (for pixel-line-presence detection) on the block (e.g. by assigning one of two binary values to each pixel). In some embodiments, all pixels identified as constituting a region, which is represented by the above-described list (e.g. generated by an MSER method, with two coordinates for each pixel in the region) are assigned the value 1 (in binary), and all remaining pixels in a block of this region are assigned the value 0 (in binary). Hence, in some embodiments, all pixels within the block but outside the region are assigned the value 0. The just-described binary values may be switched in other embodiments (e.g. pixels of a region may be assigned the value 0 and pixels in a block that are outside the region assigned the value 1). The binary values assigned in act 221 to pixels in a block are used within operation 220, and these values can be overwritten later, if binarization is performed again after merger (during verification in operation 240, described below).

Next, in act 222, processor 1013 is programmed to test for the presence or absence of a straight line passing through positions of the just-described binary-valued pixels (resulting from act 221) in the block. For example, in act 222 of some embodiments, processor 1013 checks whether a test ("pixel-line-presence test" or simply "line-presence test") is satisfied, for detecting the presence of a line segment 305 (FIG. 3A) formed by pixels 303I . . . 303J of the value 1 (which is a common binary value of all these pixels), within block 302 (FIG. 3A). In several such embodiments, operation 220 checks for presence of pixels 303I . . . 303J (FIG. 3A) of a common binary value (or a common range of grey-scale values) occurring along a straight line 304 that is oriented longitudinally relative to block 302 (e.g. parallel to or within a small angle of, whichever side of block 302 is longer). Such a straight line 304 may be formed in block 302 by, for example, a number of pixels 303A . . . 303N which include several black colored pixels (with intensity of value 1 in binary) that are located in a single row (or in alternative embodiments, located in a group of adjacent rows).

Along the straight line 304 shown in FIG. 3A, not all pixels are binarizable to value 1 (representing black color) and instead certain pixels such as pixel 303I and 303J (also called "connected component pixels") are binarizable to value 1 while pixels 303A and 303N (also called "other pixels") are binarizable to value 0. Block 302 is automatically marked as having a pixel line present along straight line 304 by a test in act 222 of some embodiments that compares the number of black pixels occurring along straight line 304 to the number of black pixels occurring along other lines passing through block 302. In many embodiments, act 222 compares the number of pixels along multiple lines parallel to one another in a longitudinal direction of block 302, for example as discussed below.

In one example, act 222 determines that a pixel line is present in block 302 along straight line 304 when straight line 304 is found to have the maximum number of black pixels (relative to all the lines tested in block 302). In another example, act 222 further checks that the maximum number of black pixels along straight line 304 is larger than a mean of black pixels along the lines being tested by a predetermined amount and if so then block 302 is determined to have a pixel line present therein. The same test or a similar test may be alternatively performed with white pixels in some embodiments of act 222. Moreover, in some embodiments of act 212, the same test or a similar test may be performed on two regions of an image, namely the regions called MSER+ and MSER−, generated by an MSER method (with intensities inverted relative to one another).

In some embodiments, block 302 is subdivided into rows oriented parallel to the longitudinal direction of block 302. Some embodiments of act 222 prepare a histogram of counters, based on pixels identified in a list of positions indicative of a region, with one counter being used for each unit of distance ("bin" or "row") along a height (in a second direction, which is perpendicular to a first direction (e.g. the longitudinal direction)) of block 302. In some embodiments, block 302 is oriented with its longest side along the x-axis, and perform act 222 by sorting pixels by their y-coordinates followed by binning (e.g. counting the number of pixels) at each intercept on the y-axis (which forms a bin), followed by identifying a counter which has the largest value among counters. Therefore, the identified counter identifies a peak in the histogram, which is followed by checking whether a relative location of the peak (along the y-axis) happens to be within a predetermined range, e.g. top ⅓rd of block height, and if so the pixel-line-presence test is met. So, a result of act 222 in the just-described example is that a pixel line (of black pixels) has been found to be present in block 302.

In several aspects of the described embodiments, processor 1013 is programmed to perform an act 223 to mark in a storage element 381 of memory 1012 (by setting a flag), based on a result of act 222, e.g. that block 302 has a line of pixels present therein (or has no pixel line present, depending on the result). Instead of setting the flag in storage element 381, block 302 may be identified in some embodiments as having a pixel line present therein, by including an identifier of block 302 in a list of identifiers 501 (FIG. 5) in memory 1012.

After performance of act 223 (FIG. 2), processor 1013 may return to act 221, e.g. if the pixel-line-presence test has not yet been applied to any block, in a set of blocks formed by identification of MSERs of the image. Alternatively, act 221 may be performed repeatedly (prior to act 222), for all blocks in the set of blocks, followed performance of acts 222 and 223 repeatedly (e.g. in a loop), for all blocks in the set of blocks that have been binarized in act 221.

After operation 220, processor 1013 of some embodiments performs operation 230 wherein a block 302 which has been marked as pixel-line-present is tested for possible merger with one or more blocks that are adjacent to block 302, e.g. by applying one or more predetermined rules. Processor 1013 of some embodiments is programmed to perform an operation 230 (also called "merger operation") which includes at least three acts 231, 233 and 233 as follows. In act 231, each block which has no intervening block between itself and a pixel-line-present block, and which is located at less than a specified distance (e.g. half of height of pixel-line-present block), is identified and marked in memory 1012 as "adjacent."

In some embodiments of act 231, mobile device 200 uses each block 302 that has been marked as pixel-line-present in act 222, to start looking for and marking in memory 1012 (e.g. in a list 502 in FIG. 5), any block (pixel-line-present or pixel-line-absent) that is located physically adjacent to the block 302 (which is marked pixel-line-present and has no other block located there-between). For example, performance of act 231 with block 403 in FIG. 4B as the pixel-line-present block results in blocks 402, 404 and 405 being marked in a memory as "adjacent" blocks. Act 231 is performed repeatedly in a loop in some embodiments, until all adjacent blocks in an image are identified followed by act 232, although other embodiments repeat the act 231 after performance of acts 232 and 233 (described next).

In act 232 of some embodiments, processor 1013 merges a pixel-line-present block with a block adjacent to it, when they are sufficiently close to one another (as indicated by a specific test, e.g. a distance (or separation) between blocks is less than height of pixel-line-present block) as identified in act 231. On completion of the merged, pixels in the merged block include at least pixels in the pixel-line-present block and pixels in the adjacent block (which may or may not have a pixel line present therein). A specific technique that is used in act 231 to merge two adjacent blocks can be different, depending on the embodiment, etc.

In some embodiments, a first list of positions of pixels of a first region 403R in a block 403 (FIG. 4B, also called "first block") that has been marked as pixel-line-present is merged with a second list of positions of pixels of a second region 405R in a block 405 located above (FIG. 4B, also called "second block"), to obtain a merged list of positions of a block 422 (FIG. 4D). In the block 422 (FIG. 4D, also called "merged block"), pixels of the first region 403R and pixels of the second region 405R (FIG. 4C) do not contact one another, because each region itself constitutes a connected component, unconnected to any other such region. The merged list of positions may then be used to identify the four corners of a rectangular block that tightly fits the merged region, in the manner described above in reference to act 212 (based on largest and smallest x and y coordinates of positions in the merged list). In some embodiments, the positions of the four corners of the merged block are stored in memory 1012, as per act 233. Furthermore, a mean intensity is computed in some embodiments, across all pixels in two blocks being merged and this value is also stored in memory 1012 in act 233, as the mean intensity of the merged block (e.g. for use in identifying binarizable values of pixels therein).

After act 233, processor 1013 of some embodiments returns to act 231 to identify an additional block that is located adjacent to the merged block. The additional block which is adjacent to the merged block (e.g. formed by merging a first block and a second block) may be a third block which has a third region therein. Therefore, in act 232 of some embodiments, processor 1013 merges a merged set of positions of the merged block with an additional set of positions of the third region in the third block. Depending on the image, the additional block which is adjacent to a merged block may itself be another merged block (e.g. formed by merging a third block with a third region therein and a fourth block with a fourth region therein). At least one of the third block and the fourth block is marked as pixel-line-present (for these two blocks to have been merged to form the additional block). Hence, act 232 in this example merges two blocks each of which is itself a merged block. Accordingly, the result of act 232 is a block that includes positions of pixels in each of the first block, the second block, the third block and the fourth block.

In some embodiments, act 232 is performed conditionally, only when certain predetermined rules are met by two blocks that are adjacent to one another. Specifically, in such embodiments, whether or not two adjacent blocks can be merged is typically decided by application of one or more rules that are predetermined (called "clustering rules"), which may be based on attributes and characteristics of a specific script, such as Devanagari script. The predetermined rules, although based on properties of a predetermined script of a human language, are applied in operation 230 of some embodiments, regardless of whether the two or more blocks being tested for merger are text or non-text. Different embodiments use different rules in deciding whether or not to merge two blocks, and hence specific rules are not critical to several embodiments. The one or more predetermined rules applied in operation 230 either individually or in combination with one another, to determine whether or not to merge a pixel-line-present block with its adjacent block may be different, depending on the embodiment, and specific examples are described below in reference to FIGS. 4A-4F.

As noted above, it is not known to processor 1013, at the time of performance of operation 220, whether any region(s) in a block 403 (FIG. 4B, also called "pixel-line-present" block) on which operation 220 is being performed, happens to be text or non-text. Specifically, operation 230 is performed prior to classification as text or non-text, which is performed in operation 250. Hence, in many embodiments, it is not known, at the time of performance of operation 230, whether two blocks being merged, are text or non-text. More specifically, on completion of operation 220, when a block 403 (FIG. 4B) has just been marked as pixel-line-present, it is not known to processor 1013 whether any region within block 403 is text or non-text.

Depending on the content of the image, a block which is marked by operation 220 as pixel-line-present may have a region representing a non-text feature in the image, e.g. a branch of a tree, or a light pole. Another block of the image, similarly marked by operation 220 as pixel-line-present, may have a region representing a text feature in the image, e.g. text with the format strike-through (in which a line is drawn through middle of text), or underlining (in which a line is drawn through bottom of text), or shiro-rekha (a headline in Devanagari script). So, operation 220 is performed prior to classification as text or non-text, any pixels in the regions that are being processed in operation 220.

In some embodiments, block 302, which is marked in memory 1012 as "pixel-line-present", contains an MSER whose boundary may (or may not) form one or more characters of text in certain languages. In some languages, characters of text may contain and/or may be joined to one another by a line segment formed by pixels in contact with one another and spanning across a word formed by the multiple characters, as illustrated in FIG. 3A. Therefore, a merged block formed by operation 230 which may contain text, or alternatively non-text, is subjected to an operation 240 (also called "verification" operation).

Figure 6:
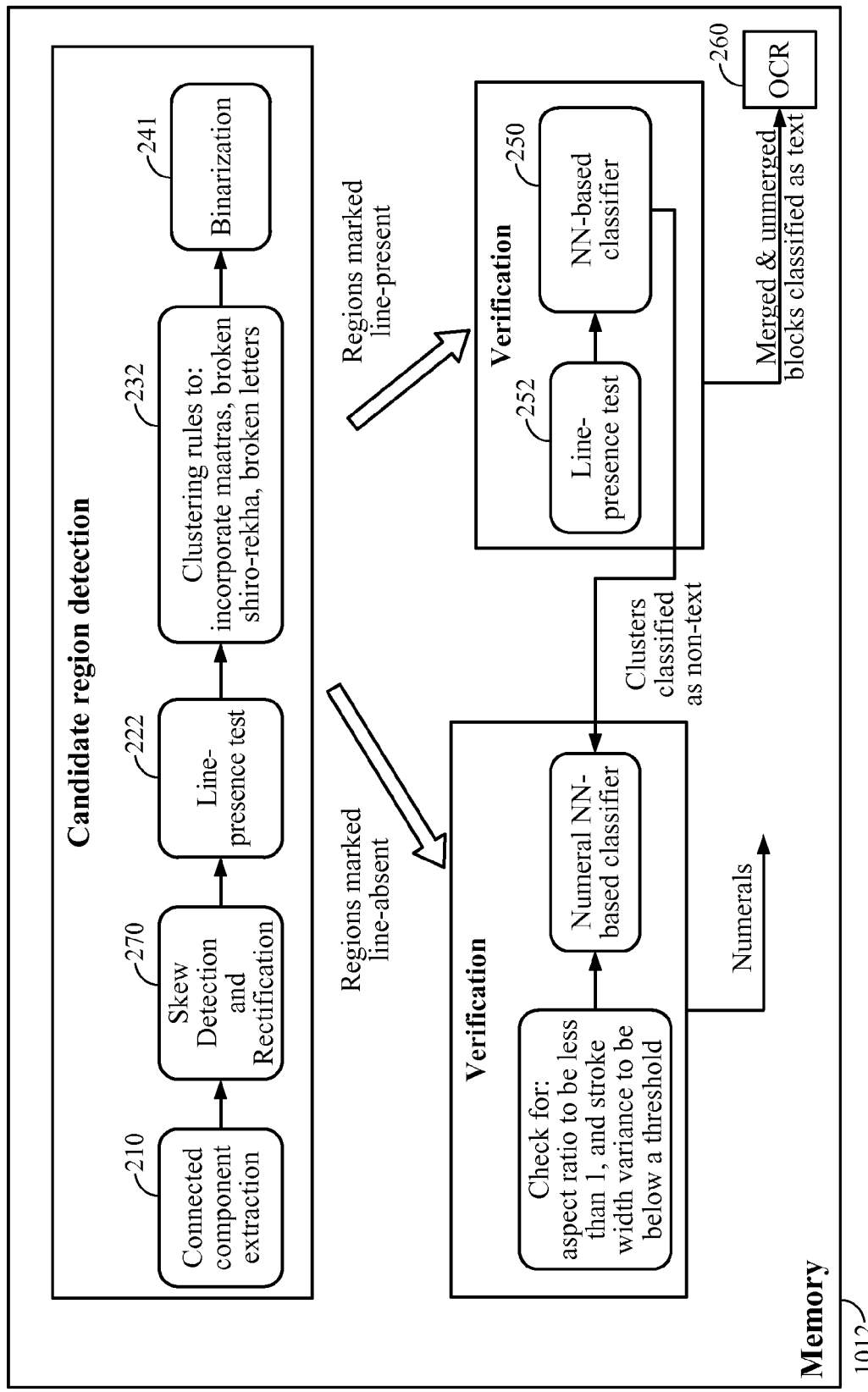
FIG. 6 illustrates, in a block diagram, computer instructions in a memory 1012 of the described embodiments, to perform several of the operations illustrated in FIG. 2.

Specifically, in some embodiments, after operation 230, mobile device 200 performs operation 240 which includes several acts that are performed normally prior to OCR, such as geometric rectification of scale (by converting parallelograms into rectangles, re-sizing blocks to a predetermined height, e.g. 48 pixels) and/or detecting and correcting tilt or skew. Hence, depending on the embodiment, a merged block obtained from operation 230 may be subject to skew correction, with or without user input. Operation 240 (for verification) of several embodiments further includes re-doing (i.e. repeating) the binarization in act 241 (see FIG. 6; initially done in act 221 above), this time for a merged block. Operation 240 of several embodiments additionally includes re-doing (i.e. repeating) the checking by performing the pixel-line-presence test in act 242 (see FIG. 6; initially done in act 222 above), this time for the merged block. Accordingly, some embodiments check whether an additional test is satisfied by the merged block, for presence of the pixels with a common binary value along another straight line passing through the merged block.

Pixel intensities that are used in binarization and in pixel-line-presence test in operation 240 (FIG. 2) are of all pixels in the merged block, which may include pixels of a pixel-line-present block (which contains a core portion of text) and pixels of an adjacent block which may be a pixel-line-absent block (which contain(s) supplemental portion(s) of text, such as accent marks). As noted above, pixels in a merged block on which operation 240 is being performed have not yet been classified as text or non-text, hence the pixel-line-presence test may or may not be met by the merged block, e.g. depending whether or not a line of pixels is present therein (based on the blocks being merged).

Accordingly, in several embodiments, binarization and pixel-line-presence test are performed twice, a first time in operation 220 and a second time in operation 240. So, a processor 1013 is programmed with computer instructions in some embodiments, to re-do the binarization and pixel-line-presence test, initially on pixels in at least one block and subsequently on pixels in a merged block (obtained by merging the just-described block and one or more blocks adjacent thereto). Note that at the time of performance of each of operations 220 and 240 it is not known whether or not the pixels (on which the operations are being performed) are text or non-text. This is because classification of pixels as text or non-text in operation 250 is performed after performance of both operations 220 and 240. Performing binarization and pixel-line-presence test twice, while the pixels are not classified as text/non-text, as described is believed to improve accuracy subsequently in operations 250 and 260 (described below).

A merged block that passes the pixel-line-presence test in operation 240 is thereafter subject to classification as text or non-text, in an operation 250. Operation 250 may be performed in the normal manner, e.g. by use of a classifier that may include a neural network. Such a neural network may use learning methods of the type described in, for example, U.S. Pat. No. 7,817,855 that is incorporated by reference herein in its entirety. Alternatively, operation 250 may be performed in a deterministic manner, depending on the embodiment.

After operation 250, a merged block that is classified as text is processed by an operation 260 to perform optical character recognition (OCR) in the normal manner. Therefore, processor 1013 supplies information related to a merged block (such as coordinates of the four corners) to an OCR system, in some embodiments. During OCR, processor(s) 1013 of certain embodiments obtains a sequence of sub-blocks from the merged block in the normal manner, e.g. by subdividing (or slicing). Sub-blocks may be sliced from a merged block using any known method e.g. based on height of the text region, and a predetermined aspect ratio of characters and/or based on occurrence of spaces outside the boundary of pixels identified as forming an MSER region but within the text region. The result of slicing in operation 260 is a sequence of sub-blocks, and each sub-block is then subject to optical character recognition (OCR).

Specifically, in operation 260, processor(s) 1013 of some embodiments form a feature vector for each sub-bock and then decode the feature vector, by comparison to corresponding feature vectors of letters of a predetermined alphabet, to identify one or more characters (e.g. alternative characters for each block, with a probability of each character), and use one or more sequences of the identified characters with a repository of character sequences, to identify and store in memory 1012 (and/or display on a touch-sensitive screen 1001 or a normal screen 1002) a word identified as being present in the merged block.

As noted above, it is not known in operation 220, whether or not block 302 (FIG. 3A) which is being checked contains any text, and it is also not known in operation 230 whether any blocks being merged contain text. Therefore, when a pixel-line-present block is merged with an adjacent block, the two blocks may contain pixels that represent a non-text feature in an image of the real world, such as a light pole. Even so, several embodiments of the type described herein are based on an assumption that a block 302 with one or more rows of pixels 303I-303N (FIG. 3A) that form a line segment 305 contains characters of text, rather than details of natural features (such as leaves of a tree or leaves of plants, shrubs, and bushes) that are normally present in a natural image. Presence of text of certain languages in a natural image results in pixels 303A-303N (FIG. 3A) that may form a line segment 305 in block 302.

Note however, that even when text is actually contained in block 302, a line segment 305 of pixels that is detected in operation 220 may be oriented longitudinally relative to a block 302 (FIG. 3A), or oriented laterally relative to block 302, or block 302 may contain both longitudinally-oriented lines and laterally-oriented lines of pixels. In an illustrative example, shown in FIG. 4B, block 403 has one longitudinal line of black pixels 403T (FIG. 4C) and two lateral lines of black pixels 403A and 403B (FIG. 4B), while block 404 has three lateral lines of black pixels (not labeled) and one longitudinal line of black pixels (not labeled).

Depending on the font and the script of the text in an image, lines of pixels of a common binary value that traverse a block need not be strictly longitudinal or strictly lateral. Instead, a longitudinally-oriented line of pixels can be but need not be longitudinal. So, a longitudinally-oriented line in a block may be at a small angle (e.g. less than 20° or 10°) relative to a top side (or bottom side) of the block, depending on a pose of (i.e. position and orientation of) camera 1011 relative to a scene. When block 302 has its longitudinal direction oriented parallel (or within the small angle) to the x-axis (e.g. after geometric rectification, scaling and tilt correction), a longitudinal pixel line through block 302 has a constant y coordinate, which is tested in some embodiments by setting slope m to zero and using a series of values of constant "c", as described above.

A pixel-line-presence test used in act 222 (FIG. 2) of some embodiments may be selected based on a language likely to be found in an image, as per act 202 described next. In some embodiments, selection of a pixel-line-presence test is made in act 202 based on a language that is identified in memory 1012 as being used by a user of mobile device 200 (e.g. in user input), or as being used in a geographic location at which mobile device 200 is located in real world (e.g. in a table). For example, memory 1012 in mobile device 200 of some embodiments includes user input wherein the user has explicitly identified the language. In another example, memory 1012 includes a table with one entry therein that maps the language Hindi as being used in the city Mumbai, India, and another entry therein that maps the language Arabic as being used in the city Riyadh, Saudi Arabia. Hence, processor 1013 of some embodiments performs a lookup on the just-described table, using a city in which mobile device 200 is located, which is identified as follows: processor 1013 uses bus 1113 to operate an in-built GPS sensor, such as sensor 1003 (FIG. 5) to obtain location coordinates, and then uses the location coordinates with map data (in disk 1008) to identify the city.

In certain illustrative embodiments, the language identified by processor 1013 is Hindi, and the pixel-line-presence test that is selected in act 202 (FIG. 2) is used identically when each of blocks 402, 403 and 404 (FIG. 4B) is evaluated by act 211 (FIG. 2) to identify presence of a pixel line that is a characteristic of the language Hindi, namely a shiro-rekha (also called "header line"). Hence, the pixel-line-presence test that is selected may test for pixels of a common binary value arranged to form a line segment 305 that is aligned with a top side of block 302 and located in an upper portion of block 302 (e.g. located within an upper one-third of the block, as described below in reference to a peak-location preset criterion in reference to FIG. 3A).

On completion of operation 220 (FIG. 2), a block 403 (FIG. 4B) that is marked as pixel-line-present may have one or more adjacent blocks such as block 405 that contain one or more portions of text, such as an accent mark. Due to the image being captured by a camera from a scene, there may be numerous other blocks (not shown in FIG. 4B) in the image which may have a similar configuration (in pixel intensities and locations), but such other blocks may (or may not) constitute details of natural features (such as leaves of plants, shrubs, and bushes), rather than portions of text.

Accordingly, accuracy in identifying text regions of a natural image (or video frame) is higher when using blocks that have been merged (based on presence of a pixel line in or between multiple characters) than the accuracy of prior art methods known to the inventors. For example, OCR accuracy of block 425 (FIG. 4F, also called "merged" block) is higher than OCR accuracy when each of blocks 402-405 (FIG. 4B) and blocks 411, 412 and 413 (FIG. 4C) are OCR processed individually. In some embodiments, operation 240 may start by performing connected component analysis on each block received as input, e.g. so that an accent mark 406 that happens to be not included in any of blocks 402-405 and 411-413 is likely to be included in a block that is classified as text and output by operation 240, for input to the OCR system.

Figure 3B:
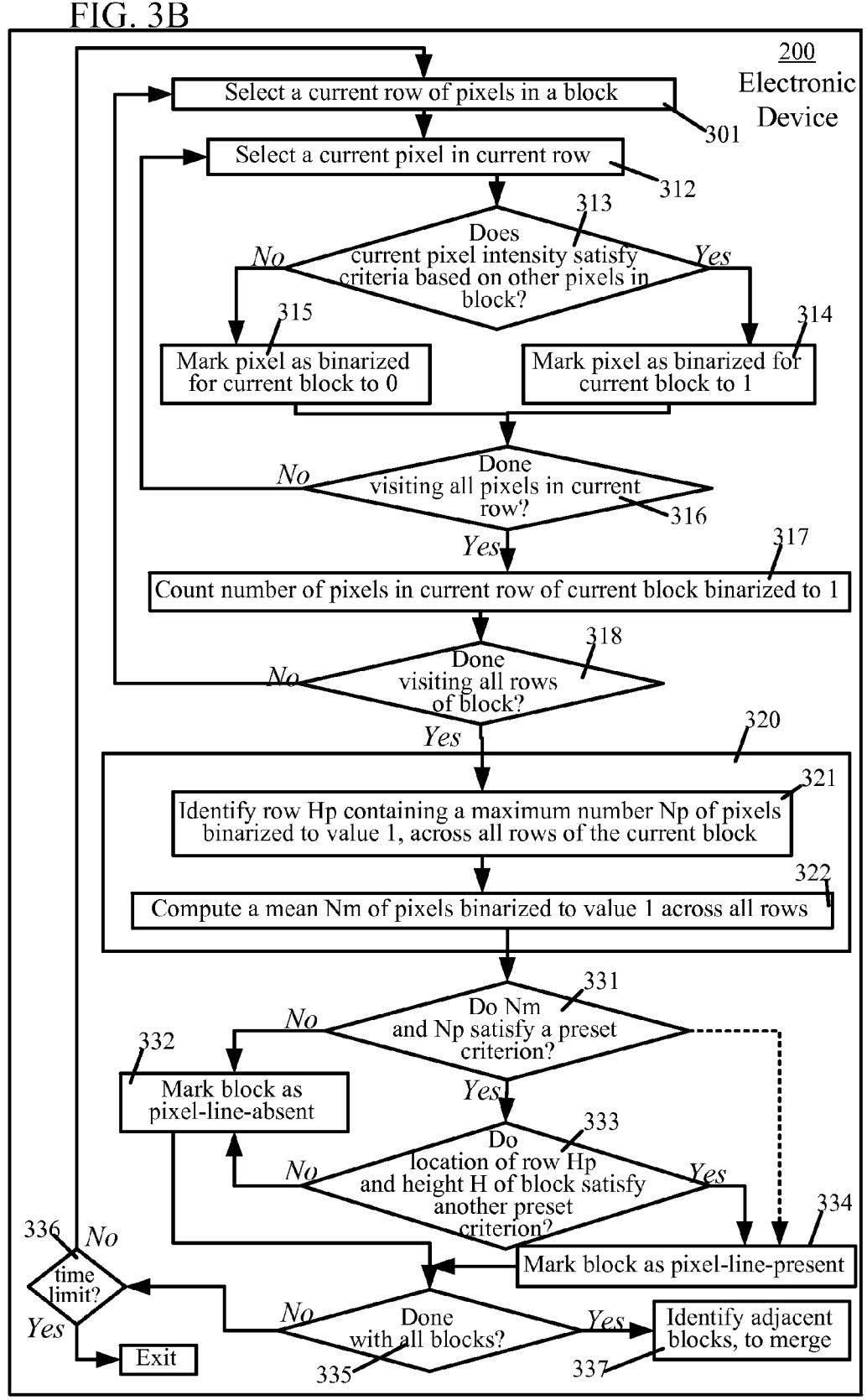
FIG. 3B illustrates, in an intermediate-level flow chart, various acts performed by a mobile device to implement a predetermined test to detect pixel line presence, in some aspects of the described embodiments.

As noted above in reference to act 222 of operation 220, FIG. 3A illustrates a block 302 of an image in memory 1012 of some embodiments of mobile device 200, wherein a selected test is applied to detect pixel line presence. An example of such a pixel-line-presence test is illustrated in FIG. 3B, and described next. After initialization in acts 311 and 312 (to select a row of pixels 303A-303N in block 302 and select as a current pixel, the pixel 303I in the selected row), the intensity of pixel 303I (also called "current" pixel) is checked (in act 313 of FIG. 3B) against one or more criteria that are based on other pixels in block 302. For example, some embodiments compare a current pixel's intensity with the mean intensity of pixels in block, and also to the mean intensity of pixels in one or more MSERs included in the block, and if the current pixel's intensity is closer to the mean intensity of MSER(s) then the current pixel's binary value is set to 1 (in act 314 in FIG. 3B), else the binary value is set to 0 (in act 315 in FIG. 3B).

The just-described binarization technique is just one example, and other embodiments may apply other techniques that are readily apparent in view of this disclosure. In a simpler example, the current pixels' intensity may be compared to just a mean intensity across all pixels in block 302, and if the current pixel's intensity exceeds the mean, the current pixel is marked as 1 (in act 314) else the current pixel is marked as 0 (in act 315). Hence, mobile device 200 may be programmed to binarize pixels by 1) using pixels in a block to determine a set of one or more thresholds that depend on the embodiment, and 2) compare each pixel in the block with this set of thresholds, and 3) subsequently set the binarized value to 1 or 0 based on results of the comparison.

On completion of acts 314 and 315, control returns to act 312 to select a next pixel for binarizing, and the above-described acts are repeated when not all pixels in the current row have been visited (as per act 316). When act 316 finds that all pixels in a row of the block have been binarized, the number of pixels with value 1 in binary (e.g. black pixels) in each row "J" of block 302 is counted (as per act 317 in FIG. 3B) and stored in an array 371 (FIG. 3A) of memory 1012, as a projection count N[J]. After projection count N[J] is computed for a current row J, control returns to act 301 to select another row J+1 for generation of the projection count. When all rows have been processed (as per act 318 in FIG. 3B), projection count N[J], if plotted in a graph for human understanding, appears as graph 310 (FIG. 3A) that conceptually shows profile 311 of a histogram, although note that graph 310 is normally not plotted by mobile device 200.

Instead, after projection count N[J] is computed for all rows of a block 302 to form the histogram, the looping ends, and control transfers to operation 320 that computes attributes at the level of blocks, e.g. in acts 321 and/or 322. In act 321, mobile device 200 identifies a row Hp that contains a maximum value Np of all projection counts N[0]-N[450] in block 302, i.e. the value of peak 308 in graph 310 in the form of a histogram of counts of black pixels (alternatively counts of white pixels). At this stage, a row Hp (e.g. counted in bin 130 in FIG. 3A) in which peak 308 occurs is also known. Similarly, in act 322, mobile device 200 computes a mean Nm, across the projection counts N[0]-N[450].

Thereafter, mobile device 200 checks (in act 331) whether the just-computed values Nm and Np satisfy a preset criterion on intensity of a peak 308. An example of such a peak-intensity preset criterion is Nm/Np≥1.75, and if not then the block 302 is marked as "pixel-line-absent" in act 332 and if so then block 302 may be marked as "pixel-line-present" in act 334 (e.g. in a location in memory 1012 shown in FIG. 3A, as storage element 381). In certain illustrative embodiments, when the preset criterion is met in act 331, another act 333 is performed to check whether a property of profile 311 satisfies an additional preset criterion.

In some embodiments, the additional preset criterion is on a location of peak 308 relative to a span of block 302 in a direction perpendicular to the direction of projection, e.g. relative to height of block 302. Specifically, a peak-location preset criterion may check where a row Hp (containing peak 308) occurs relative to height H of the text in block 302. For example, such peak-location preset criterion may be satisfied when Hp/H≤r wherein r is a predetermined constant, such as 0.3 or 0.4. Accordingly, presence of a line of pixels is tested in some embodiments within a predetermined rage, such as 30% from an upper end of a block.

When one or more such preset criteria are satisfied in act 334, mobile device 200 then marks the block as "pixel-line-present" and otherwise goes to act 332 to mark the block as "pixel-line-absent." Although illustrative preset criteria have been described, other such criteria may be used in other embodiments of act 334. Moreover, although certain values have been described for two preset criteria, other values and/or other preset criteria may be used in other embodiments.

Note that a 0.33 value in the peak-location preset criterion described above results in act 334 testing for presence of a peak in the upper $\frac{1}{3}^{rd}$ region of a block, wherein a pixel line called header line (also called shiro-rekha) is normally present in Hindi language text written in the Devanagari script. However, as will be readily apparent in view of this disclosure, specific preset criteria used in act 334 may be different, e.g. depending on the language and script of text to be detected in an image.

Specifically, in some embodiments, blocks of connected components that contain pixels of text in Arabic are marked as "pixel-line-present" or "pixel-line-absent" in the manner described herein, after applying the following two preset criteria. A first preset criterion for Arabic is same as the above-described peak-intensity preset criterion for Devanagari (namely Nm/Np≥1.75). A second preset criterion for Arabic is a modified form of Devanagari's peak-location preset criterion described above.

For example, the peak-location preset criterion for Arabic may be 0.4≤Hp/H≤0.6, to test for presence of a peak in a middle 20% region of a block, based on profiles for Arabic text shown and described in an article entitled "Techniques for Language Identification for Hybrid Arabic-English Document Images" by Ahmed M. Elgammal and Mohamed A. Ismail, believed to be published 2001 in Proc. of IEEE 6th International Conference on Document Analysis and Recognition, pages 1100-1104, which is incorporated by reference herein in its entirety. Note that although certain criteria are described for Arabic and English (see next paragraph), other similar criteria may be used for text in other languages wherein a horizontal line is used to interconnect letters of a word, e.g. text in the language Bengali (or Bangla).

Furthermore, other embodiments may test for presence of two peaks (e.g. as shown in FIG. 3C for English text) in act 334, so as to mark blocks of MSERs that satisfy the two-peak test, as "pixel-lines-present" or "pixel-lines-absent" followed by merging thereto of adjacent block(s) when certain predetermined rules are satisfied (for the English language), and followed by re-doing the two-peak test, in the manner described herein. Therefore, several such criteria will be readily apparent to the skilled artisan in view of this disclosure, based on one or more methods known in the prior art.

Accordingly, while various examples described herein use Devanagari to illustrate certain concepts, those of skill in the art will appreciate that these concepts may be applied to languages or scripts other than Devanagari. For example, embodiments described herein may be used to identify characters in Korean, Chinese, Japanese, Greek, Hebrew and/or other languages.

After marking a block in one of acts 332 and 334, processor 1013 of some embodiments checks if all blocks have been marked by one of acts 332 and 334 by performing an act 335. If the answer in act 335 is no, then some embodiments of processor 1013 checks (in act 336 in FIG. 3B) whether a preset time limit has been reached in performing the method illustrated in FIG. 3B and if not returns to act 301 and otherwise exits the method. In act 335 if the answer is yes, then processor 1013 goes to act 337 to identify adjacent blocks (as per act 231) that may be merged when a rule in a plurality of predetermined rules ("clustering" rules) is met.

FIG. 4A illustrates an example of an image 401 in the prior art.

Image 401 is processed by performing a method of some embodiments as described above, and as illustrated in FIGS. 4B-4F, to form a merged block. Note that initialization in act 212 identifies MSERs to form blocks 402-405, and in doing so an accent mark 406 of this example happens to be not identified as being included in any MSER, and therefore not included in any block.

More specifically, in act 212, a block 402 (also called "first block") is identified in the example of FIG. 4B to include a first region ठ in the image 401 with a first plurality of pixels that are contiguous with one another and include a first local extrema of intensity in the image 401. Also in act 212, a second block 403 is identified in the example of FIG. 4B to include a second region आ in the image 401 with a second plurality of pixels that are contiguous with one another and include a second local extrema of intensity in the image 401. In this manner, each of blocks 402-405 illustrated in FIG. 4B is identified in act 212. Although an MSER method is used in some embodiments of act 212, other embodiments of act 212 use other methods that identify connected components.

In several of the described embodiments, blocks 402-405 are thereafter processed for pixel line presence detection, as described above in reference to operation 220 (FIG. 2). On completion of operation 220, blocks 402, 404 and 404 are tagged (or marked) as being "pixel-line-present" (see FIG. 4B), and block 405 is tagged (or marked) as being "pixel-line-absent."

Next, image 401, has the polarity (or intensity) of its pixels reversed (as would be readily apparent to a skilled artisan) and the reversed-polarity version of image 401 is then processed by act 212 (FIG. 2) to identify blocks 411-413 (FIG. 4C). Blocks 411-413 are then processed by act 223 to mark them as pixel-line-absent.

Figure 5:
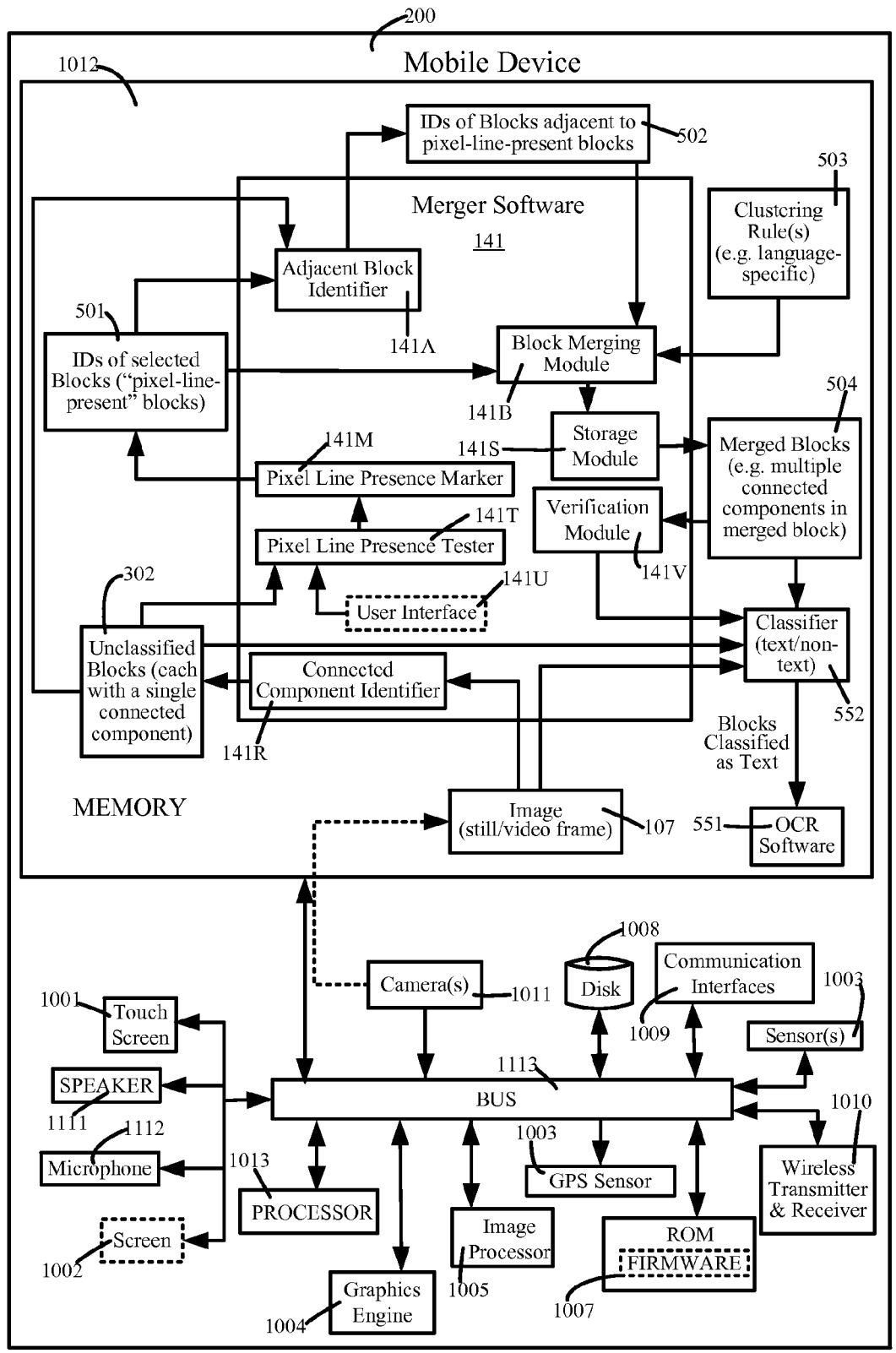
FIG. 5 illustrates, in a block diagram, a mobile device including processor and memory of the type described above, in some aspects of the described embodiments.

Next, as per operation 230, each of the blocks 402-404 (also called "pixel-line-present" blocks) are checked for presence of any adjacent blocks that can be merged. Specifically, on checking the block 402 which is identified as pixel-line-present, for any adjacent blocks, a block 411 (FIG. 4C) is found. Therefore, the blocks 402 and 411 are evaluated by application of one or more clustering rules 503 (FIG. 5). The specific clustering rules can be different for different scripts, e.g. depending on language to be recognized, in the different embodiments.

Clustering rules 503 to be applied in operation 230 may be pre-selected, e.g. based on external input, such as identification of Devanagari as a script in use in the real world scene wherein the image is taken. The external input may be automatically generated, e.g. based on geographic location of mobile device 200 in a region of India, e.g. by use of an in-built GPS sensor as described above. Alternatively, external input to identify the script and/or the geographic location may be received by manual entry by a user. Hence, the identification of a script in use can be done differently in different embodiments.

Based on an externally-identified script, one or more clustering rules are predetermined for use in operation 230. In this example, assuming the clustering rules are met, blocks 402 and 411 are merged with one another, to form block 421 (see FIG. 4D). Similarly, block 403 which has been identified as pixel-line-present, is checked for any adjacent blocks and block 405 is found. Therefore, the blocks 403 and 405 are evaluated by use of clustering rule(s) 503 in block merging module 141B (FIG. 5), and the rules are met in this example, so blocks 403 and 405 are merged by block merging module 141B to form block 422 in FIG. 4D. Finally, on checking the block 404 also identified as pixel-line-present for any adjacent blocks, a block 413 is found. Therefore, the blocks 404 and 413 are evaluated by use of clustering rule(s) 503 in block merging module 141B, and the rules are met in this example, so blocks 404 and 413 are merged by block merging module 141B to form block 423 (also called "merged" block) in FIG. 4D.

Merged blocks that are generated by block merging module 141B as described above may themselves be further processed in the manner described above in operation 230. For example, block 421 (also called "merged" block) is used to identify any adjacent block thereto, and block 422 is found. Then, the block 421 (also called "merged" block) and block 422 are evaluated by use of clustering rule(s) in block merging module 141B, and assuming the rules are met in this example, so block 421 (which is a merged block) and block 422 are merged by block merging module 141B to form block 424 (also called "merged" block) in FIG. 4E. Similarly, block 423 (also called "merged" block) is used to identify any adjacent block, and therefore block 424 (also a "merged" block) is found. Next, the blocks 423 and 424 (both of which are merged blocks) are evaluated by use of clustering rule(s) in block merging module 141B, and the rules are met in this example, so blocks 423 and 424 are merged by block merging module 141B to form block 425 in FIG. 4F. Block 425 (also a merged block) is thereafter processed by operation 230, and on finding no adjacent blocks, it is then processed by operation 240 (see FIG. 2) in the normal manner.

In some embodiments, three types of clustering rules 503 are used as follows. A first type of clustering rules 503 are used in block merging module 141B to check if a pixel-line-absent block constitutes an accent mark (also called "modifier" in English or "maatra" in Hindi) of text in the pixel-line-present block (to which the pixel-line-absent block is adjacent). For example, one first type of clustering rule may be used in block merging module 141B to check that the aspect ratio of a pixel-line-absent block lies within a predetermined range e.g. Thresh1≤Length/Breadth of pixel-line-absent block≤Thresh2 wherein Thresh1 and Thresh2 are constants that are empirically determined Another first type of clustering rule may be used in block merging module 141B to check that the location of a pixel-line-absent block is above or below the pixel-line-present block with a predetermined overlap of projections, e.g. check for 90% horizontal overlap and 10% vertical overlap between projections of two blocks on to a horizontal line (e.g. x-axis) and a vertical line (e.g. y-axis) respectively. Yet another first type of clustering rule may be used in block merging module 141B to check that the height of a pixel-line-absent block ("Maatra Height") is within a certain percentage of the height of the pixel-line-present block ("Word Height"), e.g. Thresh3*Word Height≤Maatra Height≤Thresh4*Word Height.

Still another first type of clustering rule may be used in block merging module 141B to check that a pixel-line-absent block located below a pixel-line-present block is spaced closer than the spacing between another pixel-line-absent block located above the pixel-line-present block. Similarly, some embodiments of block merging module 141B check whether an additional rule of the type described above is satisfied by a predetermined geometric attribute (e.g. aspect ratio) of at least one block (e.g. pixel-line-absent block) relative to another block (e.g. pixel-line-present block). In response to finding that such an additional rule is satisfied, the two blocks are merged in some embodiments.

A second type of clustering rules 503 are used in block merging module 141B to check if two pixel-line-present blocks that are located adjacent to one another constitute a word, with a broken header line in Hindi (or base line in Arabic) resulting in two separate connected components for the single word. For example, one second type of clustering rule may be used in block merging module 141B to check for 0% horizontal overlap and 95% vertical overlap between the two pixel-line-present blocks. Another second type of clustering rule may be used in block merging module 141B to check that a height difference between the two pixel-line-present blocks, as a percentage of the height of one of the blocks is less than 5%. Yet another second type of clustering rule may be used in block merging module 141B to check that the distance between the two pixel-line-present blocks, as a percentage of the length of one of the blocks is less than 5%.

A third type of clustering rules 503 are used in block merging module 141B to check if a pixel-line-absent block constitutes a half letter of text in the pixel-line-present block (with which the pixel-line-absent block overlaps). For example, one third type of clustering rule may be used in block merging module 141B to check that the aspect ratio (i.e. the ratio Length/Breadth) of the pixel-line-absent block is between 0.7 and 0.9 (denoting a half-character of smaller width than a single character) while the aspect of the pixel-line-present block is greater than 2 (denoting multiple characters of greater width than a single character). Yet another third type of clustering rule may be used in block merging module 141B to check for 100% horizontal overlap and 100% vertical overlap between the pixel-line-absent block and the pixel-line-present block, because a broken letter is normally embedded within a main word. Still another third type of clustering rule may be used in block merging module 141B to check that the center of the pixel-line-absent block and the center of the pixel-line-present block have Y coordinates, as a percentage of height of one of the blocks, differ from each other by less than 5%. Finally, one more third type of clustering rule may be used in block merging module 141B to check that a height difference between the pixel-line-present block and the pixel-line-absent block, as a percentage of the height of one of the blocks is less than 5%.

In some embodiments, operation 220 (described above, for pixel line presence detection) and operation 230 are performed assuming that a longitudinal direction of a connected component of text is well-aligned (e.g. within angular range of +5° and −5°) relative to the longitudinal direction of the block containing that connected component. Accordingly, in such embodiments, blocks in which the respective connected components are misaligned may not be marked as "pixel-line-present" and therefore not be merged with their adjacent "pixel-line-absent" blocks.

Figure 7:
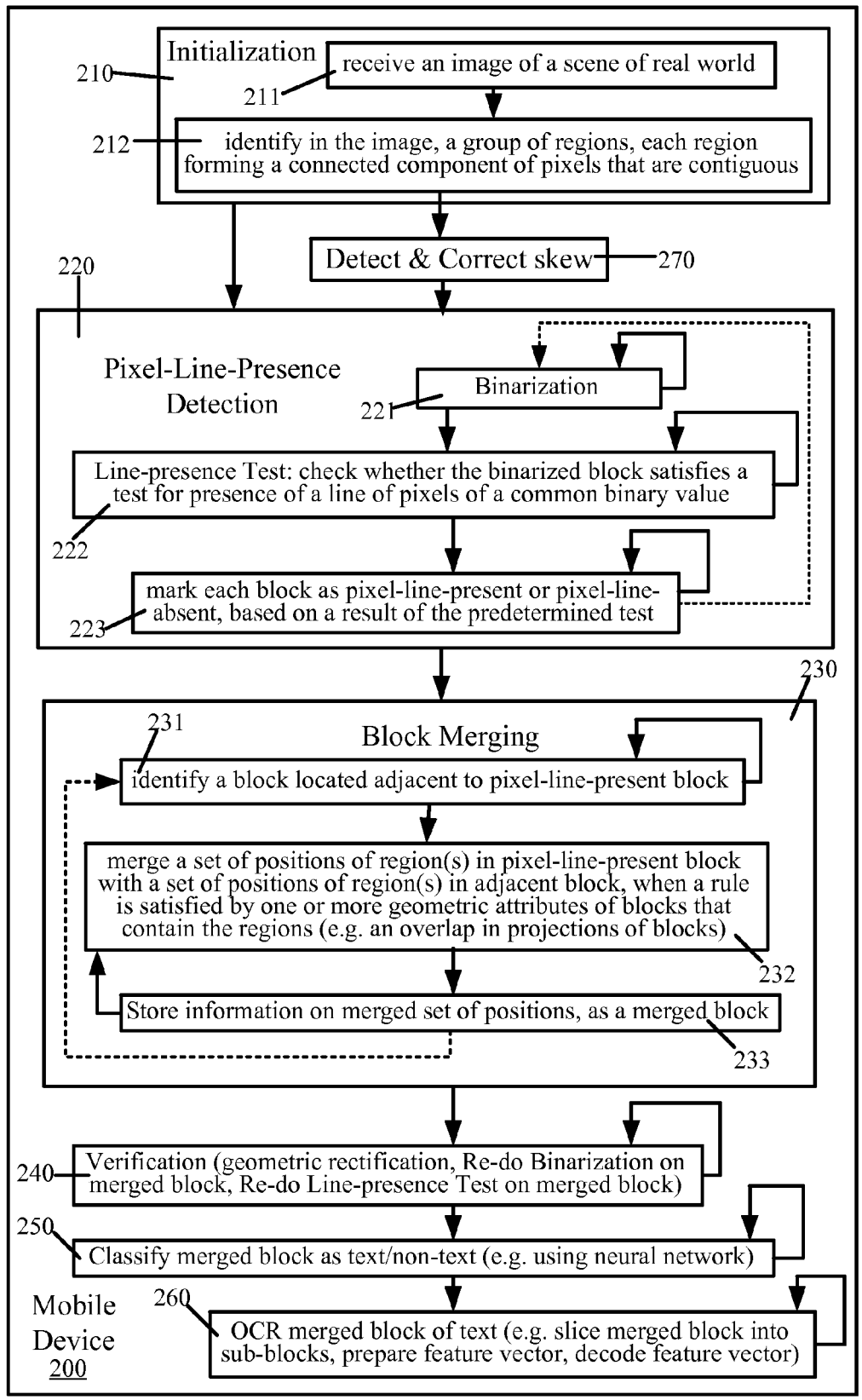
FIG. 7 illustrates, in another high-level flow chart, various acts performed by a mobile device in some aspects of the described embodiments.

Accordingly, in some embodiments, skew of one or more connected components relative to blocks that contain them may be identified by performing geometric rectification (e.g. re-sizing blocks), and skew correction (of the type performed in operation 240). Specifically, an operation 270 to detect and correct skew is performed in some embodiments in an operation 270 (after initialization operation 210) as illustrated in FIG. 7, followed by operation 220. Operation 270 may be based on prompting for and receiving user input on tilt or skew in some embodiments, while other embodiments (described in the next paragraph, below) automatically search coarsely, followed by searching finely within a coarsely determined range of tilt angle. Hence, in several embodiments it is the skew-corrected blocks that are subjected to operation 220 (for pixel line presence detection) and operation 230, as described above. In some embodiments, operation 270 to determine skew also identifies presence of a line of pixels, and hence acts 221-223 are performed as steps within operation 270. A specific manner in which skew is corrected in operation 270 can be different in different embodiments, and hence not a critical aspect of many embodiments of operation 220.

In some embodiments, processor 1013 is programmed to select blocks based on variance in stroke width and automatically detect skew of selected blocks as follows. Processor 1013 checks whether at a candidate angle, one or more attributes of projection profiles meet at least one test for presence of a straight line of pixels, e.g. test for presence of straight line 304 (FIG. 3A) of pixels in block 302 with a common binary value (e.g. pixels of a connected component). Some embodiments detect a peak of the histogram of block 302 at the candidate angle by comparing a highest value Np in the counters to a mean Nm of all values in the counters e.g. by forming a ratio therebetween as Np/Nm, followed by comparing that ratio against a predetermined limit (e.g. ratio>1.75 indicates peak). When a peak is found (e.g. the predetermined limit is exceeded by the ratio), a y-coordinate of the peak (see Hp in FIG. 3A) is compared with a height of the box Hb to determine whether the peak occurs in an upper 30% (or upper 20% or 40% in alternative embodiments) of the block. If so, the candidate angle is selected for use in a voting process, and a counter associated with the candidate angle is incremented. Processor 1013 repeats the process described in this paragraph with additional blocks of the image, and after a sufficient number of such votes have been counted (e.g. 10 votes), the candidate angle of a counter which has the largest number of votes is used as the skew angle, which is then used to automatically correct skew in each block (among the multiple blocks used in the skew computation).

Classification of the type described herein in operation 250 may be implemented using machine learning methods (e.g. neural networks) as described in a webpage at http://en.wikipedia.org/wiki/Machine_learning. Other methods of classification in operation 240 that can also be used are described in, for example the following, each of which is incorporated by reference herein in its entirety:

a. Matteo Pardo and Giorgio Sberveglieri, "Learning From Data: A Tutorial With Emphasis on Modern Pattern Recognition Methods," IEEE Sensors Journal, vol. 2, no. 3, June 2002; and b. Lasse Holmstrom, Petri Koistinen, Jorma Laaksonen and Erkki Oja, "Neural and Statistical Classifiers—Taxonomy and Two Case Studies," IEEE Transactions on Neural Networks, vol. 8, no. 1, January 1997.

Several operations and acts of the type described herein are implemented by a processor 1013 (FIG. 5) that is included in a mobile device 200 capable of identifying blocks of connected components in which a pixel line is present, followed by merger of adjacent blocks. Mobile device 200 may include a camera 1011 to generate an image 107 (or frames of a video, each of which may be image 107) of a scene in the real world. Mobile device 200 may further include sensors 1003, such as accelerometers, gyroscopes, GPS sensor or the like, which may be used to assist in determining the pose (including position and orientation) of the mobile device 200 relative to a real world scene.

Also, mobile device 200 may additionally include a graphics engine 1004, an image processor 1005, and a position processor. In addition to memory 1012, mobile device 200 may include one or more other types of memory such as flash memory (or SD card) 1008 and/or a hard disk and/or an optical disk (also called "secondary memory") to store data and/or software for loading into memory 1012 (also called "main memory") and/or for use by processor(s) 1013.

Mobile device 200 may further include a circuit 1010 (e.g. with wireless transmitter and receiver circuitry therein) and/or any other communication interfaces 1009. A transmitter in circuit 1010, which may be an IR or RF transmitter or a wireless a transmitter enabled to transmit one or more signals over one or more types of wireless communication networks such as the Internet, WiFi, cellular wireless network or other network.

It should be understood that mobile device 200 may be any portable electronic device such as a cellular or other wireless communication device, personal communication system (PCS) device, personal navigation device (PND), Personal Information Manager (PIM), Personal Digital Assistant (PDA), laptop, camera, smartphone, tablet (such as iPad available from Apple Inc) or other suitable mobile platform that is capable of creating an augmented reality (AR) environment.

Note that input to mobile device 200 can be in video mode, where each frame in the video is equivalent to the image input which is used to identify connected components, and to compute a skew metric as described herein. Also, the image used to compute a skew metric as described herein can be fetched from a pre-stored file in a memory 1012 of mobile device 200.

A mobile device 200 of the type described above may include an optical character recognition (OCR) system as well as software that uses "computer vision" techniques. The mobile device 200 may further include, in a user interface, a microphone and a speaker (not labeled) in addition to touch-sensitive screen 1001 or normal screen 1002 for displaying captured images and any text/graphics to augment the images. Of course, mobile device 200 may include other elements unrelated to the present disclosure, such as a read-only-memory 1007 which may be used to store firmware for use by processor 1013.

Mobile device 200 of some embodiments includes, in memory 1012 (FIG. 5) computer instructions in the form of merger software 141 that is used to process an image 107 of a scene of the real world, as follows. Specifically, in such embodiments, a region identifier 141R (FIG. 5) is coupled to the locations in memory 1012 wherein image 107 is stored. Region identifier 141R (FIG. 5) is implemented in these embodiments by processor 1013 executing computer instructions to implement any method of identifying MSERs, thereby to generate a set of blocks 302 in memory 1012.

Furthermore, a pixel line presence tester 141T (FIG. 5) is implemented in several embodiments by processor 1013 executing computer instructions (also called "first instructions") to use any test (e.g. by selecting the test, based on user input) to check whether each block 302, in a set of blocks of regions of an image satisfies the test. Hence, processor 1013 executing the first instructions implements a means for checking of some embodiments. As noted above, such a test may be selected by identification of a script of a specific language, designed to identify presence of a line of pixels in each block. Pixel line presence tester 141T of some embodiments is implemented to be deterministic, e.g. by including therein a binarization module (not shown) and a histogram generator (also not shown), for use in generating a profile of the number of pixels having a common binary value (relative to one another) and located along each row (and/or each column), depending on the language identified by user input received via a user interface 141U. Accordingly, pixel line presence tester 141T of such embodiments is not a classifier of text or non-text, and does not include a neural network.

Moreover, a pixel line presence marker 141M (FIG. 5) is implemented in several embodiments by processor 1013 executing computer instructions (also called "second instructions") to receive a result from pixel line presence tester 141T and respond by storing in memory 1012, e.g. a list 501 of identifiers of blocks that are marked as "pixel-line-present" blocks. Hence, processor 1013 executing the second instructions implements a means for marking of some embodiments. Blocks not identified in the list 501 are treated, in some embodiments of merger software 141, as pixel-line-absent blocks.

Furthermore, an adjacent block identifier 141A (FIG. 5) is implemented in several embodiments by processor 1013 executing computer instructions (also called "third instructions") to use a block marked in list 501 of identifiers as pixel-line-present, to identify from among the set of blocks 302, one or more blocks that are located adjacent to the pixel-line-present block e.g. as another list 502 of identifiers of adjacent blocks. Hence, processor 1013 executing the third instructions implements a means for identifying of some embodiments.

Also, processor 1013 on execution of computer instructions (also called "fourth instructions") in merger software 141 implements a block merging module 141B that uses the lists 501 and 502 to merge two blocks, and that then supplies a merged block to storage module 141S. Hence, processor 1013 executing the fourth instructions implements a means for merging of some embodiments. Storage module 141S is implemented by execution of merger software 141 by processor 1013 to store the merged block in memory 1012, e.g. as a list of positions 504 that identify four corners of each merged block.

Also, processor 1013 on execution of computer instructions (also called "fifth instructions") in merger software 141 implements a verification module 141V. Hence, processor 1013 executing the fifth instructions implements a means for re-doing the checking of some embodiments. Verification module 141V in turn includes instructions (also called "sixth instructions") to binarize pixels, within a row among a group of rows in the merged block, by assigning thereto one of two values. Verification module 141V further includes instructions (also called "seventh instructions") to count within the row, a number of pixels having a common value, to identify the at least one peak in a profile. Verification module 141V supplies the merged block to a processor that is executing classifier software 552, when the pixel line presence test is met.

In some embodiments, memory 1012 may include instructions for a classifier that when executed by processor 1013 classifies the block 402 (FIG. 4B, also called "unmerged" block) and/or block 422 (FIG. 4D, also called "merged" block) as text or non-text after binarization based on pixel values in image 107 to identify connected components therein, and any block classified as text is then supplied to OCR.

Although several aspects are illustrated in connection with specific embodiments for instructional purposes, the described embodiments are not limited thereto. For example, although mobile device 200 shown in FIG. 2 of some embodiments is a hand-held device, mobile device 200 in other embodiments is implemented by use of one or more parts that are stationary relative to a real world scene whose image is being captured by camera 1011.

As noted above, in some embodiments, when a limit on time spent in processing an image as per the method of FIG. 3B is exceeded, processor 1013 exits the method. On exiting in this manner, processor 1013 may then rotate the image through an angle (automatically, or based on user input, or a combination thereof), and then re-initiate performance of the method illustrated in FIG. 3B.

Moreover, in certain embodiments, processor 1013 may check for presence of a line of pixels oriented differently (e.g. located in a column in the block) depending on the characteristics of the language of text that may be included in the image.

Although a test for pixels of a common binary value arranged in a sequence one after another contiguously along a straight line is used in some embodiments, as will be readily apparent in view of this detailed description, such a line need not be straight in other embodiments (e.g. a portion of the pixel line inside a block may be wavy, or form an arc of a circle or ellipse).

Depending on the embodiment, various functions of the type described herein may be implemented in software (executed by one or more processors or processor cores) or in dedicated hardware circuitry or in firmware, or in any combination thereof. Accordingly, depending on the embodiment, any one or more of pixel line presence tester 141T, pixel line presence marker 141M, adjacent block identifier 141A, block merging module 141B, storage module 141S and verification module 141V illustrated in FIG. 5 and described above can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of non-transitory computer storage medium, including long term, short term, or other memory associated with the mobile platform, and is not to be limited to any particular type of memory or number of memories, or type of media upon which memory is stored.

Hence, methodologies described herein may be implemented by various means depending upon the application. For example, these methodologies may be implemented in firmware in read-only-memory 1007 (FIG. 5) or software, or hardware or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. For a firmware and/or software implementation, the methodologies may be implemented with modules (e.g., procedures, functions, and so on) that perform the functions described herein.

Any machine-readable medium tangibly embodying computer instructions may be used in implementing the methodologies described herein. For example, merger software 141 (FIG. 5) may include program codes stored in memory 1012 and executed by processor 1013. Memory 1012 may be implemented within or external to the processor 1013. If implemented in firmware and/or software, the functions may be stored as one or more computer instructions or code on non-transitory computer readable medium. Examples include non-transitory computer readable storage media encoded with a data structure (such as a sequence of images) and non-transitory computer readable media encoded with a computer program (such as merger software 141 that can be executed to perform the method of FIGS. 2, 3B, and 7).

One or more non-transitory computer readable media include physical computer storage media. A computer readable medium may be any available medium that can be accessed by a computer. By way of example, and not limitation, non-transitory computer readable storage media can comprise RAM, ROM, Flash Memory, EEPROM, CD-ROM or other optical disk storage, magnetic disk storage or other magnetic storage devices, or any other medium that can be used to store program code in the form of software instructions (also called "processor instructions" or "computer instructions") or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of one or more non-transitory computer readable storage media.

Although the present invention is illustrated in connection with specific embodiments for instructional purposes, the present invention is not limited thereto. Hence, although mobile device 200 is shown in FIG. 5 of some embodiments, in other embodiments such a device is implemented by use of form factors that are different, e.g. mobile device 200 in certain other embodiments is a mobile platform (such as a tablet) while mobile device 200 in still other embodiments is any electronic device or system. Illustrative embodiments of such an electronic device or system may include multiple physical parts that intercommunicate wirelessly, such as a processor and a memory that are portions of a stationary computer, such as a lap-top computer, a desk-top computer, or a server computer communicating over one or more wireless link(s) with sensors and user input circuitry enclosed in a housing that is small enough to be held in a hand.

Various adaptations and modifications may be made without departing from the scope of the described embodiments. Therefore, the spirit and scope of the appended claims should not be limited to the foregoing description.

The invention claimed is:

1. A method of identifying regions to merge, in an image of a scene of real world captured by a camera in a handheld device, the method of identifying regions comprising:

checking whether a first block, which contains a first region of pixels that are contiguous with one another and comprising a local extrema of intensity in the image, satisfies a predetermined test, for presence along a line, of pixels with intensities binarizable to a common value;

marking the first block as pixel-line-present, in a memory, when a result of the checking indicates the predetermined test is satisfied;

identifying a second block that is located in the image adjacent to the first block, wherein at least the first block is marked as pixel-line-present;

merging a first set of positions indicative of the first region of pixels in the first block with a second set of positions indicative of a second region of pixels in the second block to obtain a merged set of positions in a merged block, when a predetermined rule is satisfied by one or more geometric attributes of the first block and the second block;

wherein the first region of pixels and the second region of pixels do not contact one another in the merged block;

wherein the merging is performed prior to classification of any pixel in the first region of pixels and in the second region of pixels as text or non-text; and re-doing the checking, on the merged block, to determine whether the merged block satisfies the predetermined test;

wherein one or more of the checking, the marking, the identifying, the merging, and the re-doing are performed by at least one processor coupled to the memory.

2. The method of claim 1 wherein:
the predetermined test uses at least one peak in a profile obtained by projection of intensities of pixels along a direction, wherein a property of the at least one peak satisfies a predetermined condition identified in the predetermined test.

3. The method of claim 2 wherein:
the checking comprises binarizing a plurality of pixels, within a row in a group of rows in the first block, by assigning thereto one of two values, based on comparison of intensities of said plurality of pixels with a threshold determined by use of intensities of multiple pixels in the first block; and
the checking further comprises counting within said row, a number of pixels having said common value, to identify the at least one peak in the profile.

4. The method of claim 2 wherein:
the property is a location of the at least one peak, within the profile; and
the predetermined condition compares with a predetermined constant, a ratio of the location to a span of the profile.

5. The method of claim 2 wherein:
the property is a maximum value of the profile; and
the predetermined condition compares the maximum value with a mean of multiple values in the profile.

6. The method of claim 1 further comprising:
identifying, an additional block located adjacent to the merged block; and
merging the merged set of positions and an additional set of positions in the additional block, when any rule in a plurality of predetermined rules comprising said predetermined rule is satisfied by the additional block and the merged block.

7. The method of claim 6 wherein:
the additional block is obtained by merging a third region in a third block with a fourth region in a fourth block.

8. The method of claim 1 further comprising:
prior to the merging, checking whether an additional rule is satisfied by a predetermined geometric attribute of at least one of the first block and the second block;
wherein the merging is performed in response to finding that at least said additional rule is satisfied.

9. The method of claim 1 further comprising:
prior to the checking, selecting the predetermined rule based at least on a language associated in a table with a geographic location of the scene of real world.

10. The method of claim 1 further comprising:
prior to the checking, selecting the predetermined rule based at least on a language identified by user input.

11. The method of claim 1 wherein:
a region $Q_i$ in the image is determined by comparisons between an intensity i used as a threshold and intensities of a plurality of pixels included in said region $Q_i$;
said region $Q_i$ comprises a local extrema in the intensity i in said image; and
a number of pixels in said region $Q_i$ remains within a predetermined range relative to changes in the intensity i across a range $i-\Delta$ to $i+\Delta$, with a local minima in a ratio $[Q_{i-\Delta}-Q_{i+\Delta}]/Q_i$ occurring at the intensity i.

12. The method of claim 1 wherein:
the at least one processor, the memory, and the camera are comprised in the handheld device; and
the image is comprised in a video frame among a stream of video frames generated by the camera.

13. The method of claim 1 wherein:
the at least one processor, the memory, and the camera are comprised in the handheld device; and
the image is comprised in a set of snapshots captured by the camera.

14. The method of claim 1 wherein:
the at least one processor, the memory, and the camera are comprised in the handheld device; and
the image is comprised in the memory.

15. The method of claim 1 further comprising:
classifying the merged block as text or non-text depending on the result of said re-doing.

16. A mobile device comprising:
a camera;
a memory operatively connected to the camera to receive at least an image therefrom;
a processor operatively connected to the memory to execute a plurality of computer instructions stored in the memory, to supply information related to a merged block, the merged block being obtained by merging a first block with a second block;
wherein the processor is configured to check whether the first block, which contains a first region of pixels that are contiguous with one another and comprising a local extrema of intensity in the image, satisfies a predetermined test, for presence along a line, of pixels with intensities binarizable to a common value;
wherein the processor is configured to mark the first block as pixel-line-present, in the memory, when a result of the check indicates the predetermined test is satisfied;
wherein the processor is configured to identify the second block for being located in the image adjacent to the first block, when at least the first block is marked as pixel-line-present;
wherein the processor is configured to merge a first set of positions indicative of the first region of pixels in the first block with a second set of positions indicative of a second region of pixels in the second block to obtain a merged set of positions in the merged block, when a predetermined rule is satisfied by one or more geometric attributes of the first block and the second block;
wherein the first region of pixels and the second region of pixels do not contact one another in the merged block;
wherein the processor is configured to obtain the merged block prior to classification of any pixel in the first region of pixels and in the second region of pixels as text or non-text; and
wherein the processor is configured to re-do the check with the merged block, to determine whether the merged block satisfies the predetermined test.

17. The mobile device of claim 16 wherein:
the predetermined test uses at least one peak in a profile obtained by projection of intensities of pixels along a direction, wherein a property of the at least one peak satisfies a predetermined condition identified in the predetermined test.

18. The mobile device of claim 17 wherein the processor is programmed to:
binarize a plurality of pixels, within a row among a group of rows in the first block, by assigning thereto one of two values, based on comparison of intensities of said plurality of pixels with a threshold determined by use of intensities of multiple pixels in the first block; and
count within the row, a number of pixels having said common value, to identify the at least one peak in the profile.

19. The mobile device of claim 17 wherein:
the property is a location of the at least one peak, within the profile; and
the predetermined condition compares with a predetermined constant, a ratio of the location to a span of the profile.

20. The mobile device of claim 17 wherein:
the property is a maximum value of the profile; and
the predetermined condition compares the maximum value with a mean of multiple values in the profile.

21. The mobile device of claim 16 wherein the processor is programmed to:
identify, a third block located adjacent to the merged block; and
merge the merged set of positions and a third region in the third block, when any rule in a plurality of predetermined rules including said predetermined rule, is satisfied by the third block and the merged block.

22. One or more non-transitory computer readable storage media comprising computer instructions, which when executed in a handheld device, cause one or more processors in the handheld device to perform operations, the computer instructions comprising:
first instructions to check whether a first block, which contains a first region of pixels that are contiguous with one another and comprising a local extrema of intensity in an image captured by a camera, satisfies a predetermined test, for presence along a line, of pixels with intensities binarizable to a common value;
second instructions to mark the first block as pixel-line-present, in a memory, when a result of the checking indicates the predetermined test is satisfied;
third instructions to identify a second block that is located in the image adjacent to the first block, wherein at least the first block is marked as pixel-line-present;
fourth instructions to merge a first set of positions indicative of the first region of pixels in the first block with a second set of positions indicative of a second region of pixels in the second block to obtain a merged set of positions in a merged block, when a predetermined rule is satisfied by one or more geometric attributes of the first block and the second block;
wherein the first region of pixels and the second region of pixels do not contact one another in the merged block;
wherein the merging is performed prior to classification of any pixel in the first region of pixels and in the second region of pixels as text or non-text; and
fifth instructions to re-do the check with the merged block, to determine whether the merged block satisfies the predetermined test;
wherein one or more of the first instructions, the second instructions, the third instructions, the fourth instructions and the fifth instructions are to be executed by at least one processor coupled to the memory.

23. The one or more non-transitory computer readable storage media of claim 22 wherein:
the predetermined test uses at least one peak in a profile obtained by projection of intensities of pixels along a direction, wherein a property of the at least one peak satisfies a predetermined condition identified in the predetermined test.

24. The one or more non-transitory computer readable storage media of claim 23 further comprising:
sixth instructions to binarize a plurality of pixels, within a row among a group of rows in the first block, by assigning thereto one of two values, based on comparison of intensities of said plurality of pixels with a threshold determined by use of intensities of multiple pixels in the first block; and
seventh instructions to count within the row, a number of pixels having said common value, to identify the at least one peak in the profile.

25. The one or more non-transitory computer readable storage media of claim 23 wherein:
the property is a location of the at least one peak, within the profile; and
the predetermined condition compares with a predetermined constant, a ratio of the location to a span of the profile.

26. The one or more non-transitory computer readable storage media of claim 23 wherein:
the property is a maximum value of the profile; and
the predetermined condition compares the maximum value with a mean of multiple values in the profile.

27. The one or more non-transitory computer readable storage media of claim 22 wherein:
a third block located adjacent to the merged block is identified on repeated execution of the third instructions; and
the merged set of positions is further merged with a third region in the third block, when any rule in a plurality of predetermined rules including said predetermined rule is found to be satisfied by the third block and the merged block.

28. An apparatus for identifying regions of text, the apparatus comprising:
a memory storing an image of an environment outside the apparatus;
means for checking whether a first block, which contains a first region of pixels that are contiguous with one another and comprising a local extrema of intensity in the image, satisfies a predetermined test, for presence along a line, of pixels with intensities binarizable to a common value;
means for marking the first block as pixel-line-present, in the memory, when a result of the checking indicates the predetermined test is satisfied;
means for identifying a second block that is located in the image adjacent to the first block, wherein at least the first block is marked as pixel-line-present;
means for merging a first set of positions indicative of the first region of pixels in the first block with a second set of positions indicative of a second region of pixels in the second block to obtain a merged set of positions in a merged block, when a predetermined rule is satisfied by one or more geometric attributes of the first block and the second block;
wherein the first region of pixels and the second region of pixels do not contact one another in the merged block;
wherein the merging is performed prior to classification of any pixel in the first region of pixels and in the second region of pixels as text or non-text; and
means for re-doing the checking with the merged block, to determine whether the merged block satisfies the predetermined test;
wherein one or more of the means for checking, the means for marking, the means for identifying, the means for merging, and the means for re-doing comprise at least one processor coupled to the memory.

29. The apparatus of claim 28 wherein:
the predetermined test uses at least one peak in a profile obtained by projection of intensities of pixels along a direction, wherein a property of the at least one peak satisfies a predetermined condition identified in the predetermined test.

* * * * *